United States Patent [19]
Cannon et al.

[11] Patent Number: 5,748,484
[45] Date of Patent: *May 5, 1998

[54] SYSTEM FOR PRINTING SOCIAL EXPRESSION CARDS IN RESPONSE TO ELECTRONICALLY TRANSMITTED ORDERS

[75] Inventors: Thomas G. Cannon, Encampment, Wyo.; Daniel L. DeHart, Loveland, Colo.

[73] Assignee: Onkor, Ltd., Eastsound, Wash.

[*] Notice: The term of this patent shall not extend beyond the expiration date of Pat. No. 5,552,994.

[21] Appl. No.: 598,208

[22] Filed: Feb. 7, 1996

Related U.S. Application Data

[63] Continuation-in-part of Ser. No. 90,803, Jul. 12, 1993, Pat. No. 5,552,994, which is a continuation-in-part of Ser. No. 949,715, Sep. 23, 1992, Pat. No. 5,600,563.

[51] Int. Cl.$^6$ .................................................. G06F 19/00
[52] U.S. Cl. .................................................. 364/479.03
[58] Field of Search ........................ 364/468.01, 479.02, 364/479.03, 479.05, 468.24; 235/379, 381, 383, 385, 375; 345/326–335

[56] References Cited

U.S. PATENT DOCUMENTS

| | | |
|---|---|---|
| 4,750,036 | 6/1988 | Martinez . |
| 4,839,829 | 6/1989 | Freedman . |
| 4,876,592 | 10/1989 | Von Kohorn . |
| 4,947,028 | 8/1990 | Gorog . |
| 5,027,400 | 6/1991 | Baji et al. . |
| 5,036,427 | 7/1991 | Buckley et al. . |
| 5,056,029 | 10/1991 | Cannon . |
| 5,077,607 | 12/1991 | Johnson et al. . |
| 5,093,718 | 3/1992 | Hoarty et al. . |
| 5,124,980 | 6/1992 | Maki . |
| 5,172,413 | 12/1992 | Bradley et al. . |
| 5,243,174 | 9/1993 | Veeneman et al. ............. 364/479 |
| 5,327,265 | 7/1994 | McDonald . |
| 5,513,116 | 4/1996 | Buckley et al. ............. 364/479 |
| 5,513,117 | 4/1996 | Small ............. 364/479 |
| 5,546,316 | 8/1996 | Buckley et al. ............. 364/479.03 |
| 5,552,994 | 9/1996 | Tal ............. 364/468.01 |
| 5,555,496 | 9/1996 | Tackbary et al. ............. 364/479.03 |
| 5,559,714 | 9/1996 | Banks et al. ............. 364/479.03 |
| 5,561,604 | 10/1996 | Buckley et al. ............. 364/479.05 |
| 5,600,563 | 2/1997 | Cannon et al. ............. 364/468.24 |
| 5,615,123 | 3/1997 | Davidson et al. ............. 364/479.03 |
| 5,687,087 | 11/1997 | Taggart ............. 364/479.03 |

OTHER PUBLICATIONS

"CreataCard" system introduced by Custom Expressions, Inc., Glendale CA, May, 1990.

"Newsmaker of the Month: Indra Turnbull, President, Innovative Icons Creator 'Isabella'" *Gift and Stationery Business* Nov., 1993, p. 56.

"TV Answer" (Is ITV Here to Stay?) system from TV Answer, Inc. (1941 Roland Clarke Place, Reston, VA 22091) to begin operations in 1993.

*Primary Examiner*—James P. Trammell
*Attorney, Agent, or Firm*—Dorr, Carson, Sloan & Birney, P.C.

[57] ABSTRACT

A system for viewing, ordering, and printing social expression cards includes a database preparation system, a number of card display/order systems, and a number of card printing systems. The database preparation system uses a scanner to input images from a plurality of cards, or a computer software program to create images for use in card designs. A card description database defines the layout of each card in terms of its component images and text, and their locations on the card. The database preparation system can also build a card parameter database to enable a user to select a desired category of cards. Each card display/order system accesses these databases and image files by computer network, modem, cable television, or by transfer of removable data storage media. The card display/order system allows the user to input parameters to pick the category of cards to be displayed.

39 Claims, 22 Drawing Sheets

To Fig. 2 (Contd.)

*Fig. 2 (Contd.)*
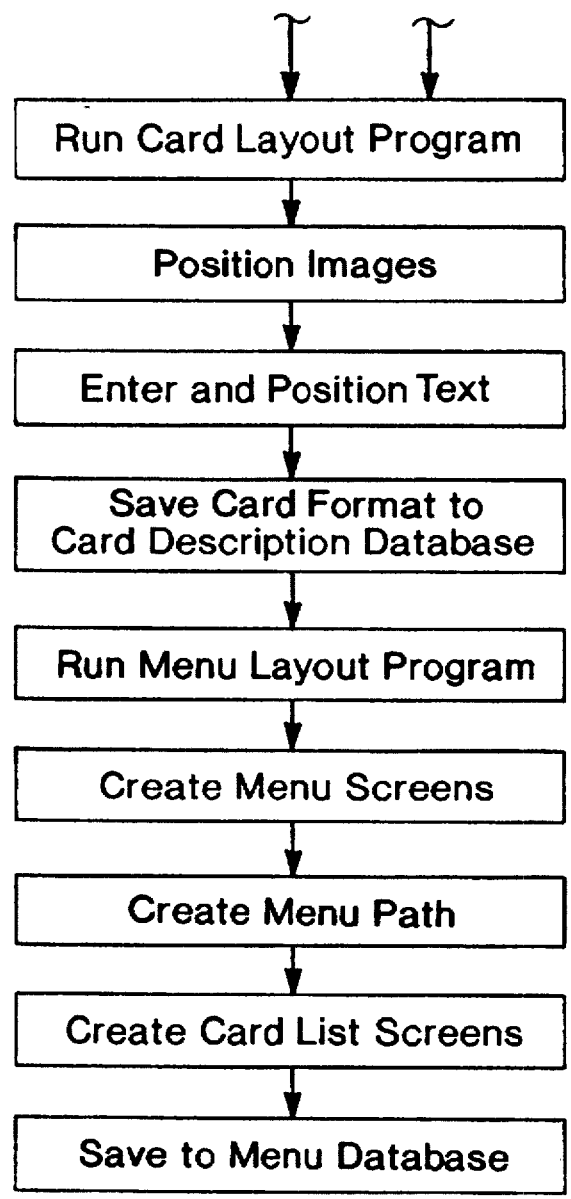

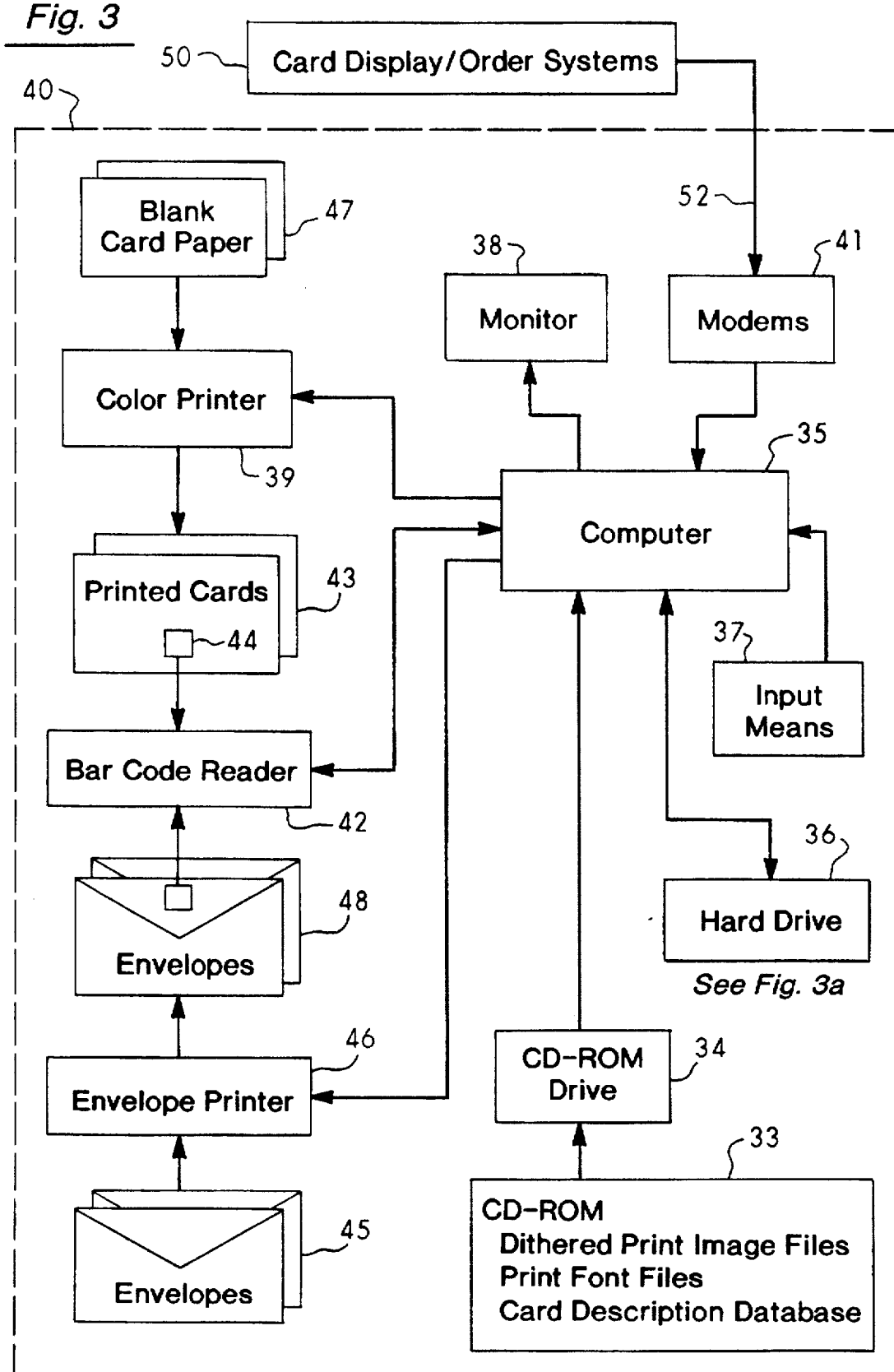

*Fig. 3a*

Hard Drive

Operating System Program
    CD-ROM Driver Program
    Printer Driver Program
    Card Printing System
     Control Program
    Card Description Database
    Good Images File
    Good Fonts File
    Good Cards File
    Bar Code Printing Program
    Fax/Communications Program
    Order Processing Program
    Fax analysis Program
    Order Information Database
    Mail Management Program
    Print List Creation Program
    Print List Files
    Order Information Retrieval Program
    Card/Envelope Registration Program
    Available Cards File

| Tag Section |
| --- |
| photometricinterpretation = RGB |

| Image Data (RGB) |
| --- |
| 3 bytes = 1 pixel |

Fig. 6

| Tag Section |
| --- |
| Photometricinterpretation = Palette Color |
| ImageWidth = 300 dots per inch resolution |
| ImageLength = 300 dots per inch resolution |

| Color Palette |
| --- |
| 256 entries of 24 bit colors |

| Image Data (Palette index values) |
| --- |
| 1 byte = 1 pixel |

Fig. 7

| Tag Section |
| --- |
| Photometricinterpretation = Palette Color |
| ImageWidth = 85 dots per inch resolution |
| ImageLength = 85 dots per inch resolution |

| Color Patette |
| --- |
| 256 entries of 24 bit colors |

| Image Data (Palette index values) |
| --- |
| 1 byte = 1 pixel |

*Fig. 8*

| Signature |
| --- |
| Image length (at 85 dots per inch resolution) |
| Image Width (at 85 dots per inch resolution) |
| Compression Block Size |
| Normalized Color Palette |
| Data Block #1 Compressed Size |
| Compressed Data Block #1 |
| Data Block #2 Compressed Size |
| Compressed Data Block #2 |
| ⋮ |
| Data Block #N Compressed Size |
| Compressed Data Block #N |

*Fig. 9*

| Signature |
| --- |
| Image Length (at 300 dots per inch resolution) |
| Image Width (at 300 dots per inch resolution) |
| Data Block #1 Compressed Size |
| Compressed Data Block #1 |
| Data Block #2 Compressed Size |
| Compressed Data Block #2 |
| ⋮ |
| Data Block #N Compressed Size |
| Compressed Data Block #N |

Fig. 12(a)

File Header
- Version number
- Number of cards
- Number of repeated images
- Credits
- Reserved

Fig. 12(b)

Card Image Component
- Card component type
- Card side
- X coordinate
- Y coordinate
- Image file designation

Fig. 12(c)

Card User Text Component
- Card component type
- Card side
- X coordinate
- Y coordinate
- Text Font
- RGB color of text
- Number of input lines
- Type of user input

Fig. 12(d)

Card/Repeated Image Header
- Name
- Deleted Flag
- Card orientation
- Type (card or repeated image)
- Number of card components

Fig. 12(e)

Card Text Component
- Card component type
- Card side
- X coordinate
- Y coordinate
- Text Font
- RGB color of text
- Text string

Fig. 12(f)

Card Repeated Image Component
- Card component type
- Name of Repeated Image Fig. 17
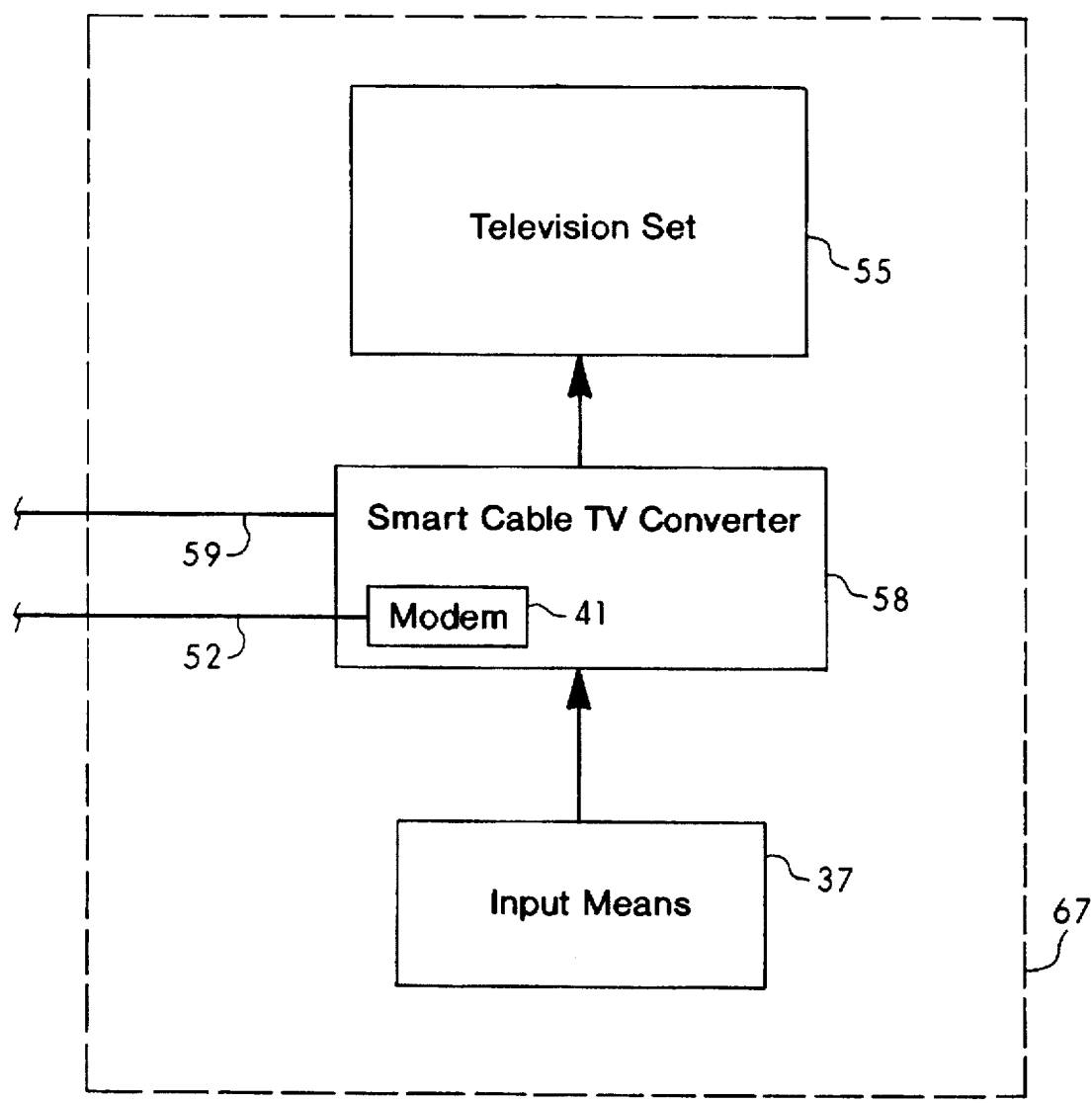
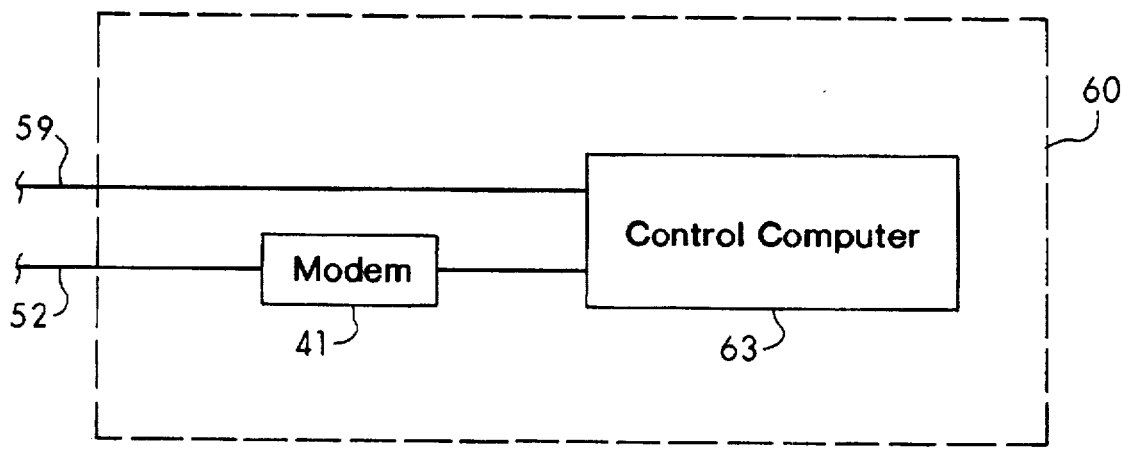

SYSTEM FOR PRINTING SOCIAL EXPRESSION CARDS IN RESPONSE TO ELECTRONICALLY TRANSMITTED ORDERS

RELATED APPLICATION

The present application is a continuation-in-part of the applicants' U.S. patent application Ser. No. 08/090,803 entitled "System For Printing Social Expression Cards in Response to Electronically Transmitted Orders", filed on Jul. 12, 1993 U.S. Pat. No. 5,552,994, which is a continuation-in-part of U.S. patent application Ser. No. 07/949,715, entitled "System for Printing Social Expression Cards", filed on Sep. 23, 1992 U.S. Pat. No. 5,600,563.

BACKGROUND OF THE INVENTION

1. Field of the Invention

The present invention relates generally to the field of greeting cards. More specifically, the present invention discloses a system for creating a database of greeting card designs that then can be customized or personalized and manufactured through printing systems in response to electronically transmitted orders.

2. Statement of the Problem

Greeting cards or social expression cards have traditionally been manufactured in large quantities by various manufacturers at locations remote from the point of purchase or retail outlet. Social expression cards include greeting cards, invitations, announcements, and the like and are referred to herein as "greeting cards" or "social expression" cards. After manufacture, the cards are shipped, either directly or through wholesale distributors, to a variety of retail outlets, such as specialty card shops, drug stores, grocery stores, and the like where they are displayed and sold to retail customers.

One of the most significant problems associated with current methods of manufacturing greeting cards is the very large amount of inventory needed at the point of sale, and the space required to properly display the inventory of greeting cards. For example, most greeting cards are displayed on card racks that group the cards into a number of categories, or fields, to assist a customer in locating the type of card desired. Typically, a large display rack is needed to expose a sufficient portion of the face of each card to allow easy visual scanning by the customer of the various cards available in a particular category or field.

Social Expression Cards. A number of systems have been invented in the past to provide customization of social expression cards, including the following:

| Inventor | Patent No. | Issue Date |
|---|---|---|
| Cannon | 5,056,029 | Oct. 8, 1991 |
| Buckley, et al. | 5,036,472 | July 30, 1991 |

"CreataCard" system introduced by Custom Expressions, Inc., Glendale, Calif., in May, 1990.

"Newsmaker of the Month: Indra Turnbull, President, Innovative Icons Creator 'Isabella'", *Gift and Stationery Business* (November 1993, p. 56)

Cannon discloses an on-site system for manufacturing and vending social expression cards that queries the customer to input a series of special occasion parameters to select a card from a database of available card designs.

The "CreataCard" system was introduced by Custom Expressions, Inc. in May, 1990. This system is an on-site unit that guides customers through a series of card selections on a touch-sensitive display screen. After choosing the desired style of card, the customer enters information to personalize the card, such as names, dates, ages, messages, etc. It is believed that the card information is stored in vector graphic format since the card is drawn line-by-line using an eight-color pen plotter.

The "Isabella" system described in *Gift and Stationery Business* (November 1993, p.56) allows the user to select a desired card or invitation from a book of samples. The user enters an identification code into a computer system to display an image of the specified card. The user can also specify the color, type style, and a personalized message for the card. Order information is then transmitted by modem from each remote computer system to a central printing facility, where the orders are filled by overprinting pre-printed cards using conventional, manually-operated offset printing presses. Nothing in the Isabella system teaches or suggests a menu system for assisting the user in selecting cards, or a computerized system for automatically printing cards in response to electronically transmitted orders.

Buckley, et al., disclose a computer controlled machine for vending personalized greeting cards and the like. The unit provides audio and video presentations of the products and options available to the customer. Base products such as pre-printed forms are stored within the unit for transfer by a robotic arm to a printer for customization.

There are also a number of commercially available software programs that allow personal computer systems to print greeting cards. For example, "Card Shop" by Artsci, Inc. allows Macintosh computer users to select from a menu of fifty greeting cards covering a variety of occasions. "Greeting Card Maker" by Artivision, Inc. allows Apple computer users to print cards, invitations, and announcements. Also, "The Print Shop" by Broderbund, Inc., "Announcements for Windows" by Parsons Technology, Inc. and "Studio of Greetings!" by Eqyx, Inc. allow IBM-PC users to create and print greeting cards.

A major limitation of all systems which provide on-site manufacture and/or personalization of social expression cards is the cost of the apparatus which must be placed at each site, whether a retail site or other site, such as a residence. The number of retail sites which can achieve sales levels which justify the placement of such apparatus is limited to a small percentage of all retail sites. Further, such apparatus does not address other problems faced by retail sites having such apparatus and greeting card purchasers using such apparatus at retail sites. For example, because users of such apparatus typically do not know in advance the personalized text they wish to input, a considerable period of time is required for each customer to compose and enter their personalized text. Since the apparatus can be used by only one person at a time or in the case of a multi-user system, only a few people at a time, many potential users do not wait to use the system if it is already in use. This limits the average daily revenue generated by the apparatus.

Also, greeting card purchasers must normally remember to purchase cards and mail or otherwise deliver them before specific dates. It is not unusual that someone forgets to purchase a card before a particular date or having purchased a card forgets to mail or deliver it on time. Another problem which card purchasers face is not remembering what card designs they have previously sent to someone and, therefore, being concerned about sending duplicates of cards previously sent.

Desktop Publishing and Automated Printing Systems. A wide variety desktop publishing software, e.g. Aldus Page-maker and QuarkXPress, has long been commercially available for conventional personal computers. Desktop publishing systems allow a trained user to create virtually any type of custom publications, primarily such as newsletters and brochures. However, it is possible to create custom greeting cards, invitations, business cards and the like using a desktop publishing system.

In addition to this general prior art in the field of desktop publishing, a number of systems have been created in the past for automated printing and "electronic mirror editing" (EME), including the following:

| Inventor | Patent No. | Issue Date |
|---|---|---|
| Freedman | 4,839,829 | June 13, 1989 |
| McDonald | 5,327,265 | July 5, 1994 |

Freedman discloses an automated printing control system for initiating and completing a "job order" for printing services and preparing a printing cost analysis. The information communicated between the terminals in Freedman is used only for cost estimating, scheduling, and tracking the status of jobs.

McDonald discloses a system for remotely accessing a database of images to facilitate editing high-quality color brochures and other color documents containing color images and related text material. The print center 12 maintains a database of available images in both a low-resolution, compressed format that can be quickly transmitted by modem to the customer's computer, and a high-resolution format for printing. The customer can request that individual images be transmitted by modem from the print center (col. 4, lines 26–33) for use in creating a page layout. The customer can position, crop, stretch, and otherwise modify the image while on-line (col. 4, lines 34–35). The final page layout with an image frame, but without the image, is transmitted by modem from the customer's computer to the print center (col. 4, lines 38–39). This process is referred to as "electronic mirror editing" (EME) because page layout editing performed by the customer is mirrored by the print center (col. 3, lines 47–57, and col. 4, lines 47–52).

A number of broadcast and cable television systems have also been invented in the past which allow consumers to view products, such as greeting cards, on a television set and place orders for products, including the following:

| Inventor | Patent No. | Issue Date |
|---|---|---|
| Bradley, et al. | 5,172,413 | Dec. 15, 1992 |
| Maki | 5,124,980 | Jun. 23, 1992 |
| Hoarty, et al. | 5,093,718 | Mar. 3, 1992 |
| Johnson, et al. | 5,077,607 | Dec. 31, 1991 |
| Baji, et al. | 5,027,400 | Jun. 25, 1991 |
| Gorog | 4,947,028 | Aug. 7, 1990 |
| von Kohorn | 4,876,592 | Oct. 24, 1989 |
| Martinez | 4,750,036 | Jun. 7, 1988 |

"TV Answer" system from TV Answer, Inc., (1941 Roland Clarke Place, Reston, Va. 22091) to begin operations in 1993.

Bradley, et al., disclose a pay TV system which allows a user to authorize the purchase of advertised goods by entering personal identification numbers.

Maki discloses a network or cable television system which allows two-way data and voice telephone communication services between a central head end facility linked to an off-site switched telephone network and a plurality of remote subscriber stations.

Hoarty, et al., disclose an interactive cable television system which is able to rapidly display photographic quality images on a home TV set in response to commands transmitted by a home user using a remote control input device.

Johnson, et al., disclose a interactive cable television transaction terminal comprising a keyboard used for entry of information and a screen generator for creating visual displays of selection items or completion fields.

Baji, et al., disclose a multimedia bi-directional television broadcast system which allows users to select and display product information and then order a product.

Gorog discloses an automated order and payment system which allows users to enter product order information by optically scanning codes in printed media or displayed on a television set. Also disclosed is the entry of voice orders via a voice recognition means.

Von Kohorn discloses a system which allows TV program viewers to respond to information in such programs by making an entry on a keyboard.

Martinez discloses an interactive television and data transmission system.

3. Solution to the Problem

None of the prior art references uncovered in the search show a system, as in the present invention, for displaying, ordering, and printing social expression cards in which card images are stored as a set of display images in a format to facilitate rapid display on a color monitor or television set, and as a corresponding set of print images in a format to rapidly produce high resolution printed cards. In addition, the system includes a card description database that defines each card in terms of its component images, text, and fields for personalization. Also, none of the prior art references show: (1) a system for printing social expression cards in which cards are printed at one or more sites in response to orders for individual cards placed by consumers at a number of remote sites, including retail and residential locations, where order information is transmitted to the card printing site through fax modems, other modems, or other telecommunications means and after processing is stored in an order information database with a unique card order code identifying each order received; (2) a system for printing card sender and receiver names and addresses on card mailing envelopes where addresses are retrieved from an order information database created from data received through a fax modem or other modem or other telecommunication means; and (3) a system where card order information is transmitted by telecommunication or other means to a card printing facility where individual personalized cards are printed in response to this order information.

SUMMARY OF THE INVENTION

This invention provides a system for ordering and printing social expression cards that includes a database preparation system, a number of card printing facilities, and a plurality of card display/order facilities. The database preparation system uses a scanner to input graphic images from a plurality of cards, or a computer software program to create a plurality of images for use in card designs. A high resolution print image and a lower resolution display image are created from each of these images. The card description database defines the layout of each card in terms of its component images and text, and their locations on the card. The database preparation computer system can also build a card parameter database to associate cards into different categories. For example, the card parameter database can define a structure of menu screens to query the user to input or select one or more desired card parameters (e.g. the intended card recipient, for example, "GIRL FRIEND"; the card graphic design subject matter, for example, "FLOWERS"; the card graphic design style, for example "REALISTIC"; the original artwork media, for example, "WATERCOLOR"; the sending occasion, for example, "BIRTHDAY"; interests of the intended card recipient, for example, "GARDENING"; characteristics of the intended card recipient relating to physical appearance, age, sex, etc., for example, "TEENAGE GIRL"; the publisher of the card, for example, "LOONART DESIGNS"; the artist who created the original artwork for the card, for example, "JAN JOHNSON HAMBURG"; the name of the recipient, for example "BEVERLY"). The listed card parameters are by way of example only and are not intended to be inclusive of all possible card parameters. A list of card designs is associated with parameters in the card parameter database. In one embodiment, selected databases and image files are then copied onto removable data storage media for distribution to the card display/order systems and the card printing systems. Alternatively, the databases and image files may be stored in a central data storage unit which may be accessed by the card display/order facilities and the card printing facilities. In yet another alternative embodiment, the databases and image files are stored in a data storage unit associated with a server that is located remotely from the card display/order systems and the card printing system, but is accessible to the card display/order systems and card printing system through a network or telecommunications link.

Each card display/order facility accesses these databases and image files by computer network, modem, cable television, or by transfer of removable data storage media. The card display/order facility allows the user to input parameters to pick the category of cards to be displayed. The user can order a selected card to be printed and input information to personalize the card. The order is then electronically transmitted to a card printing facility for printing.

A typical card printing system has a display, a color printer, input means, data storage unit, a computer processor, and optionally, a network access means. The computer processor may be identical to that used for database preparation or it may be a separate processor. The card printing system processor accesses the card description database to selectively retrieve and print the print images for a selected card by means of a color printer. Cards are selected for printing as determined by a list of cards generated by reference to a database of card order information created, in turn, from data received through a fax modem, other modem, or other telecommunication means from a card display/order facility where the order information was selected or input. Here again, the order information can either be transmitted directly from each card display/order system to the card printing system, or via a server that is accessible by both the card display/order systems and the card printing system.

A primary object of the present invention is to provide a card display, ordering, and printing system which can (1) receive and process electronically transmitted orders for card designs, optionally including personalized text and images, such as a handwritten signature, and (2) print high-resolution printed cards at a time determined by reference to a delivery date designated by the card purchaser.

Another object of the present invention is to provide a card printing system that includes means whereby a person can, at a location remote from the location at which cards are printed, select or input desired characteristics of card designs, view cards or images of cards which have the desired characteristics, select a desired card to be printed at a time determined by a specified delivery date, and enter other order information.

Another object of the present invention is to provide a card printing system which prints mailing addresses (entered as order information by a customer) on card mailing envelopes in response to a unique printed code read from a greeting card printed by the card printing system.

Yet another object of the present invention is to provide a card printing system for creating a card description database in which each card is defined in terms of its component images, text, and fields for personalization.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIGS. 3 and 3a are diagrammatic views of a card printing system used for printing personalized and non-personalized social expression cards.

FIG. 5 is a diagram of the structure of the RGB color TIFF file produced from the images scanned by the color scanner.

FIG. 6 is a diagram of the structure of the print palette color TIFF file generated from the image file shown in FIG. 5.

FIG. 7 is a diagram of the structure of the display palette color TIFF file generated from the image file shown in FIG. 5.

FIG. 8 is a diagram of the structure of the compressed display image file generated from the display image file shown in FIG. 7.

FIG. 9 is a diagram of the structure of the compressed print image file generated from the print image file shown in FIG. 6.

FIGS. 12(a) through 12(f) are diagrams of the various possible components of the card description database.

FIG. 17 is a diagrammatic view of a card display/order system where the card display means and the order entry and transmission means are accomplished using a digital cable television converter containing an integrated computer.

DETAILED DESCRIPTION OF THE INVENTION

Figure 18:
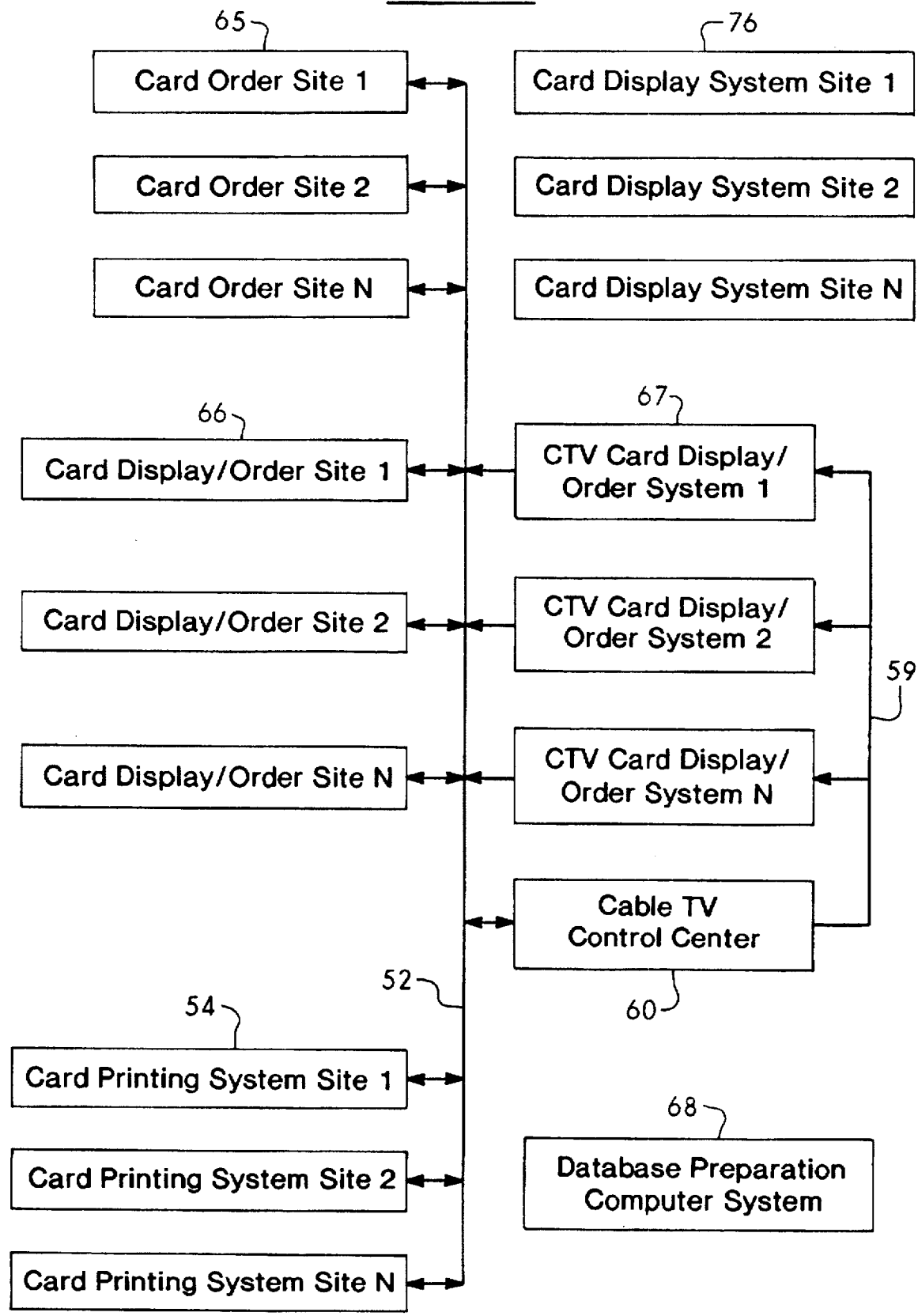
FIG. 18 is a diagrammatic view of the overall system of this invention.

FIG. 18 shows the relationship of the various system elements of this invention. Details of each system element are shown in FIG. 1 through FIG. 17.

Figure 1:
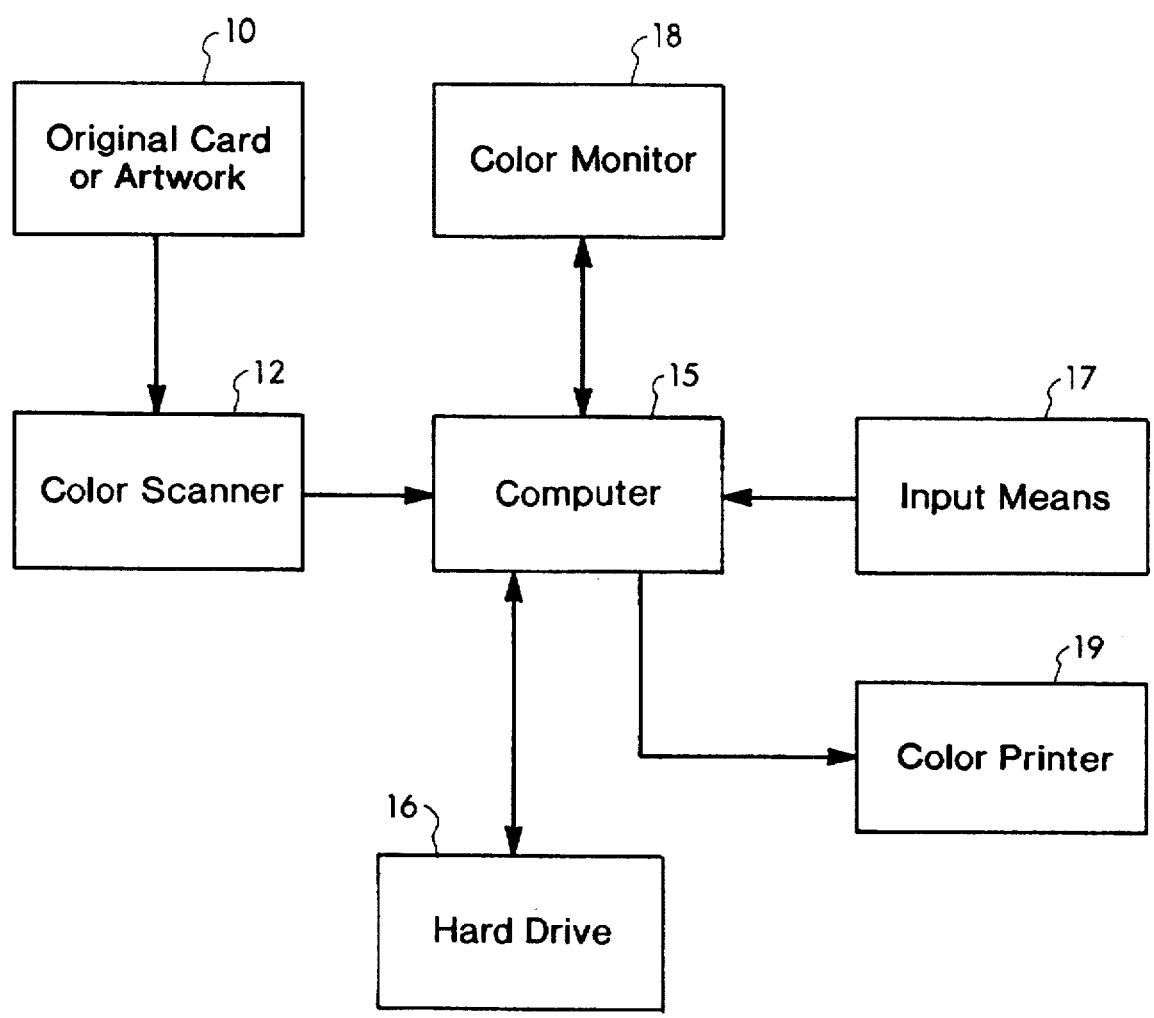
FIG. 1 is a schematic diagram of a computer system used in preparing social expression card designs by the process of this invention.

FIG. 1 shows an overall schematic view of the computer system 68 used to prepare databases of social expression card designs ("database preparation computer system"). The steps in this process are outlined in the flowchart provided in FIG. 2. Copies of certain of these databases may then be transferred to a memory storage means which may be accessed directly by a single card printing system 40 shown in FIG. 3 or by one or more card printing systems, for example, through a network shown in FIG. 13. The card printing systems print cards in response to card identification, personalization, and other order information received through one or more fax modems or other modems or other telecommunication means. Alternatively, copies of these databases may be distributed via CD-ROM or other removable storage media to a number of networked card printing systems either at a single card printing system site or at a number of card printing system sites, as shown in FIG. 18, that print cards in response to card identification and personalization information received through one or more fax modems or other modems or other telecommunication means.

Figure 2:
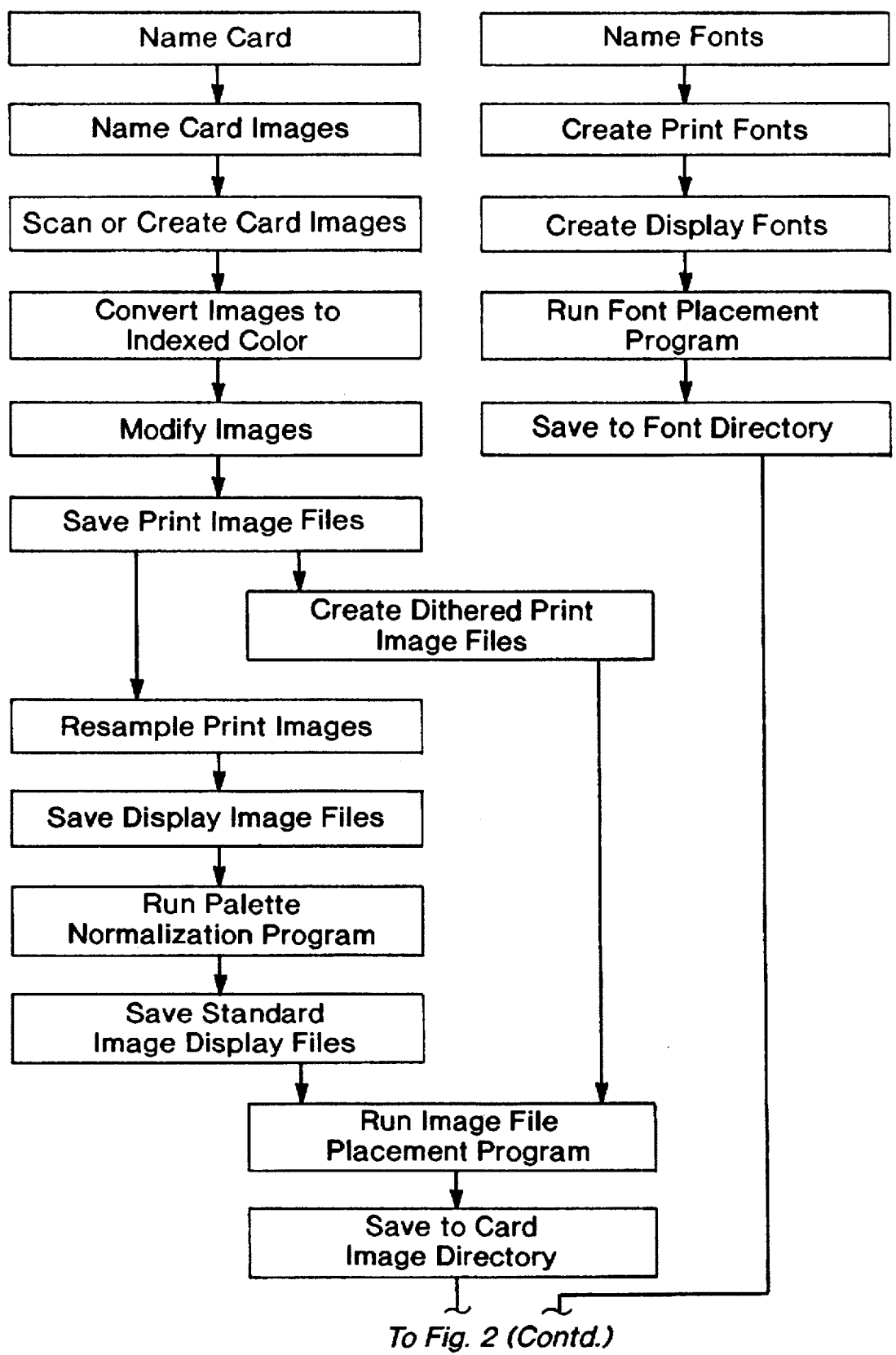
FIG. 2 is a flow chart of the overall method used in preparing databases of social expression card designs by the process of this invention.

Turning to FIGS. 1 and 2, in preparing the card description database each original social expression card is viewed and the publisher name and publisher's card number on the card is noted. For example, card number 150 published by David Mekelburg and Friends. If original art images (i.e. images created using artistic media including computer paint programs) are being used, card numbers are assigned serially to each submission from an artist or other source. A three letter publisher code is assigned to the publisher ("publisher code"). For example "DMF" for David Mekelburg and Friends.

The card is then named using the publisher code followed by no more than four numerals ("card name"). For example, the card name for card number 150 published by David Mekelburg and Friends is DMF0150. Each image on the original card ("original card image") including the front panel (or page), inside panel (or page) and back panel (or page) images, is named with the card name followed by a number indicating the order in which the image appears on the card ("image name"). For example, DMF01501 would be the image name for the first image on card number 150 published by David Mekelburg and Friends.

Any image that appears in the same location on more than one card ("repeated image"), such as a logotype, is named with the publisher code followed by a four letter code and a single numeral indicating the order in which the repeated image appears on the card relative to other repeated images on the same card ("repeated image name"). For example, DMFLOGO1 is the repeated image name for the first repeated image to appear on card number 150 published by David Mekelburg and Friends.

Except for original art images created using computer paint programs ("computer art images") all images on original cards 10 are scanned using a color scanner 12, such as the Microtek 600Z ScanMaker (Microtek International, Inc. No. 6, Industry East Road 3, Science-based Industrial Park, Hsinchu, Taiwan 30077, R.O.C.) connected to a computer 15 such as an IBM PC compatible having eight megabytes of random access memory (RAM) which in turn is connected to one or more large capacity memory devices 16, such as a 1.2 gigabyte Micropolis Model 1598-15 hard drive (Micropolis, Inc., Chatsworth, Calif.). The computer also includes input means 17, such as a keyboard, mouse, or track ball. Optionally, a color printer 19 can also be included.

Scanning is typically done at 300 dots per inch (dpi) and 24 bits per pixel. Scanned image files resulting from the scanning process and computer art image files are stored in directories identified by a publisher code. For example, the directory for the publisher David Mekelburg and Friends is named DMF. Individual image files are saved in the appropriate publisher directory under the image name previously assigned.

Each scanned image file or computer art image file is then opened in a digital image processing program, such as Aldus Photostyler (Aldus Corporation, 411 First Avenue South, Seattle, Wash. 98104-2871). Scanned images are displayed on a color monitor 18, such as a Goldstar Model 1460 Plus (Goldstar Co., Ltd., Lucky-Goldstar Twin-Tower, 20 Yeouido-dong, Yeongdungpo-gu, Seoul, 150-606, Korea) capable of displaying images in at least 256 colors.

The scanned image or computer art image is saved in a file in RGB (red, green, blue) true color format as shown in FIG. 5, which may contain up to 16.7 million colors. Each pixel in the image requires three bytes of storage. The capability of the monitor and video card used in the system will determine how many of the colors in an RGB true color file will be displayed. For example, the Goldstar Model 1460 Plus monitor used with a VGA Integra card (ATI Technologies, Inc., 3761 Victoria park Avenue, Scarborough, Ontario, Canada M1W 3S2) will display 256 of the 16.7 million colors possible in the RGB true color file. The displayed scanned image or displayed computer art image is then converted to a format with a limited palette of colors ("indexed color image"). This is accomplished in Aldus Photostyler by selecting "Indexed 256-color" from the image menu which creates an indexed color image with a palette of 256 colors. Before completing the conversion when Aldus Photostyler is used, the type of color palette to be created is specified as "Adaptive" to best simulate the colors in the original image.

If necessary, the indexed color image is cropped. This is accomplished in Aldus Photostyler using a cropping tool to select an area to be saved. The indexed color image size is checked to determine if it will fit within a defined area. For example the area could be defined as a four inch by six inch rectangle. If the image is larger than the defined area, it should be reduced to four inches by six inches. This is accomplished in Aldus Photostyler by selecting the area to be resized and then choosing "Resize" from the Transform menu and entering the appropriate dimensions.

Typically, when an original card image or original art image on a white background is scanned, the white background of the displayed indexed color image contains a number of random colored pixels. These colored pixels must be removed. This can be accomplished in Aldus Photostyler by selecting the white background area using the magic wand tool and then choosing the "Clear" command from the Edit menu.

When an original card image or original art image having areas of a single color is scanned, the corresponding areas of the displayed indexed color image will contain a large number of pixels of varying colors. These pixels should be changed to a single color which is the same as the single color area on the original card image or original art image. This can be accomplished in Aldus Photostyler by selecting the dominant pixel color in a single color area of a displayed image with the eyedropper tool. This color is identified as the fill color. The color area to be made into a single color is then selected using the magic wand tool. The "Fill" command is then chosen from the Edit menu and the selected area is automatically filled with the dominant pixel color previously chosen with the eyedropper tool.

When modification of the indexed color image is completed, the image is saved in two different formats, (1) a print image file which will be processed to create files which can be used by a color printer ("dithered print image file") and (2) a display image file which can be displayed on a color monitor or television set. The print image file is saved to the hard drive in a color image file format such as Tag Image File Format (TIFF) as shown in FIG. 6. In addition, if a minimum amount of memory space is to be used, the file can be compressed using, for example, the Lempel-Zev and Welch (LZW) compression algorithm. The file is identified with the image name followed by the extension .PCP ("Print image file name"). For example, DMF01501.PCP is the print image file name for the first print image on card number 150 published by David Mekelburg and Friends. The print image files are typically saved to a separate directory.

The hue and saturation of palette colors associated with each print image file must be adjusted to new values (i.e., color corrected) so the printed output will match the colors of the original card image or original art image. This is accomplished with a color correction program, such as Colorcorrect (Onkor, Ltd., P.O. Box 240, Masonville, Colo., 80541) which generates new palette colors by automatically applying red, green, and blue color correction curves to each color in the indexed color image palette. The details of color correction are well known in the art and therefore need not be explained here.

To allow rapid printing, print image files should be modified with a dithering program, for example Ditherimage (Onkor, Ltd.) before they are used by a color printer in a card printing system. In an indexed color image, each pixel is represented by an index number that corresponds to an entry in a 24 bit color table containing 256 colors of a possible 16.7 million colors. The process of dithering reduces an indexed color image to a 4 bit color image (dithered print image). The dithered print image matches the subtractive primary colors (i.e., cyan, magenta, and yellow) plus black used by the printer. To compensate for this loss of color resolution, a dithering algorithm is used. A dithered print image uses an N by N matrix (for example 5 by 5), of cyan, magenta, yellow or black pixels ("dither matrix") to represent the 24 bit color value of each indexed color image pixel. Individual dither matrix color pixels have varying values so the color of the matrix is perceived by the human eye as an approximation of the original pixel color in the indexed color image.

In addition to dither matrix creation, the dithering program overlaps adjoining dither matrices. This is necessary because the indexed color image has a resolution of 300 dpi which matches the printer resolution. If no overlapping of dither matrices was done and, for example, a 5 by 5 dither matrix was used, the resulting dithered image would have one twenty-fifth the spatial resolution of the indexed color image. By overlapping the dither matrices, the color value of each 4 bit pixel is averaged between all overlapping pixels. This overlapping gives the completed dithered print image a blended appearance that is visually pleasing. The details of image dithering are well documented (J. D. Foley & A. Van Dam, *Fundamentals of Interactive Computer Graphics*, Addison-Wesley Publishing Co., 1984, pages 593–602). In conventional systems, dithering is done by the color printer after the image data has been downloaded from the computer to the printer and before the image is printed. In the present system, the print image is pre-dithered before the print image file is stored. This results in more rapid printing and also reduces the size of the print image file.

Dithered print image files are identified with the image name followed by the extension .PCD ("dithered print image file name"). For example DMF01051.PCD is the dithered print image file name for the first dithered print image on card number 150 published by David Mekelburg and Friends. Dithered print image files are then compressed using the LZW compression algorithm and saved in a proprietary format as shown in FIG. 9. To provide rapid retrieval from a large number of dithered print image files, dithered print image files are moved from the dithered images directory to a number of nested directories using a software program which automatically relocates the files ("image file placement program"). This can be accomplished by using a program such as Putimage (Onkor, Ltd.).

FIG. 7 is a diagram of the structure of the display palette color TIFF file generated from the image file shown in FIG. 5. The display image file shown in FIG. 8 is created from this display image. The displayed size of display images is determined by their resolution, therefore, the display image resolution must be adjusted to provide a displayed image which may be easily viewed on a range of monitor and television screen sizes. For example, the resolution available on a typical television set is 512 lines by 768 pixels. At this resolution on a thirteen inch television screen, for a display image to appear at approximately the same size as a printed image created with a dithered print image file, the display image must have a resolution of 80 dpi. An 80 dpi display image can be created from the 300 dpi print image in Aldus Photostyler by selecting "Resample" from the Transform menu and entering the resolution desired.

When the display image is saved it is processed by a palette normalization program, such as Fiximage (Onkor, Ltd.), which analyzes the color palette associated with each display image and transforms it, as shown in FIG. 8, into a palette having certain colors in specific palette locations ("standard color palette"). For example, red, green, blue, cyan, magenta, yellow, black and white are located in the first through eighth palette locations. The resulting file is then compressed using the LZW compression algorithm and saved in a proprietary format ("standard display image file") as shown in FIG. 8. The file is identified with the image name followed by the extension .DSC ("standard display image file name"). For example DMF01501.DSC is the standard display image file name for the first display image on card number 150 published by David Mekelburg and Friends. To provide rapid retrieval from a large number of display image files, display image files are moved from the display images directory to a number of separate directories using a software program which automatically relocates the files ("image file placement program"). This can be accomplished by using a program such as Putimage (Onkor, Ltd.).

Two additional types of files which are created are print font files and display font files. A font is defined as a set size bitmap of a particular typeface. The resolution of print fonts must match the resolution of a particular printer (e.g. 300 dpi for the Tektronix Phaser III color printer). The displayed size of display fonts is determined by their resolution, therefore, the display font resolution must be adjusted to provide a displayed font which may be easily viewed on a range of monitor and television screen sizes. For example, the resolution of a typical television set is 512 lines by 768 pixels. At this resolution on a thirteen inch television screen, for a display font to appear at approximately the same size as a print font, the display font must have a resolution of 80 dpi.

A six letter code is assigned the font ("font code"). For example, the font code for Howard Thin is HOWLSS. Each point size of the font is named by the font code followed by two numerals ("font name"). For example, the font name for 14 point Howard Thin is HOWLSS14. Print font files are identified with the font name followed by the extension 0.300 ("print font file name"). For example, HOWLSS14.300 is the print font file name for 14 point Howard Thin. Display font files are identified with the font name followed by the extension 0.085 ("display font file name"). For example, HOWLSS14.085 is the display font file name for 14 point Howard Thin.

Print fonts and display fonts can be created using a scaleable font library, such as the Digi-Fonts, Inc. Typeface Library and a font conversion program, such as Digi-Duit! (Digi-Fonts, Inc., 528 Commons Drive, Golden, Colo. 80401). Both print font files and display font files are saved to a directory named "Fonts" on the hard disk.

To provide rapid retrieval from a large number of font files, both display and print font files are moved from the fonts directory to a number of nested directories using a software program which automatically relocates the files ("font file placement program"). This can be accomplished by using a program such as PutFonts (Onkor, Ltd.) For example, when the font file placement program is run, the print font File HOWLSS14.300 and the display font file HOWLSS14.085 are automatically transferred from the fonts directory to a separate subdirectory.

Print images, display images and text used in a social expression card format must be positioned on the front, inside, or back panels (or pages) of the social expression card using a software program with this capability ("card layout program"). This can be accomplished with a program such as Cardmaker (Onkor, Ltd.). For example, card number 150 published by David Mekelburg and Friends would be formatted using the Cardmaker software program by (1) selecting "image" from a menu. (2) The card name DMF0150 is entered. (3) The Cardmaker program assumes the social expression card is rectangular, for example four and one-half inches by six and one-half inches, so the card format must be designated as horizontal or vertical. (4) The desired panel (or page) for image placement is selected ("F" for front panel, "T" for inside panel or "B" for back panel). (5) The image name DMF01501 is entered (the first image on the front panel). (6) The image position is entered ("C" for center of panel, "T" for top of panel, "B" for bottom of panel, "L" for left side of panel, "R" for right side of panel, or specific x and y coordinates are entered). Positioning of the first image would be completed at this point. Additional images are positioned by repeating steps four through six.

Text is entered and positioned on the social expression card format by (1) selecting "Text" from a menu. (2) Selecting the panel (or page) on which the text is to be placed. (3) Entering the text position by selecting "C" for center of panel, "T" top of panel, "B" bottom of panel, "L" left side of panel, "R" right side of panel, or by entering specific x and y coordinates. (4) Selecting the text font and point size from a list of fonts and point sizes. For example, 1035 Avon Book, 16 point. (5) Selecting the text color from a list of available colors. For example, black, white, red, blue, magenta, green, or cyan. (6) Entering the text, for example "Happy Birthday", using the keyboard 17.

If an area for personalized text 72 to be retrieved from an order information database constructed from data received through a fax or other modem or other telecommunications means, is to be specified, this is accomplished by (1) choosing "Personalized Text" from a menu. (2) Selecting the panel where personalized text is to be placed. (3) Entering the text position by selecting "C" for center of panel, "T" for top of panel, "B" for bottom of panel, "L" for left side of panel, "R" for right side of panel, or by entering specific x and y coordinates. (4) Selecting the text font and point size from a list of fonts and point sizes (e.g. 1318 Howard Thin, 14 point). (5) Selecting the text color from a list of available colors (e.g. black, white, red, blue, magenta, green, or cyan). (6) Entering the number of lines of personalized text to be allowed (e.g. six lines). The card printing system control program determines, at the time user text is retrieved from the order information database, how many characters can be placed on each line given the font specified in the card description database.

An area or field for a personalized image 73, such as a signature or a picture of the card purchaser, retrieved from an order information database constructed from data received through a fax or other modem or other telecommunications means, may be automatically positioned in a specified relationship to other card components, for example, a personalized image 73 may be positioned one-quarter of an inch below a text area or personalized text area on the inside panel (or page) of all cards.

Figure 10:
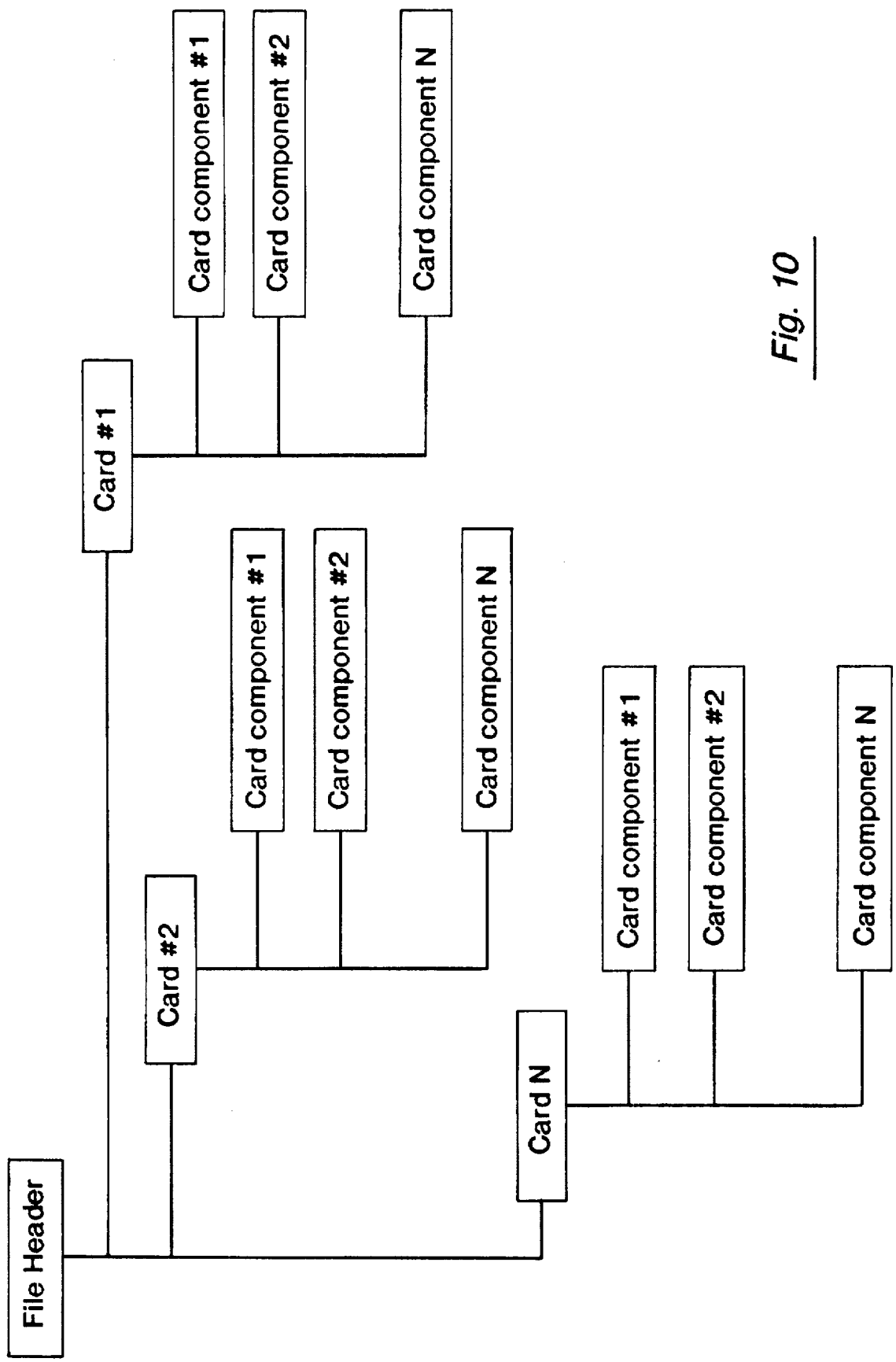
FIG. 10 is diagram of the structure of the card description database.

The front, inside, and back card panels (or pages) are individually viewed on the monitor display 18 to assure that images and text are properly positioned. If modifications are required, the appropriate steps are repeated. Card formats created by the card layout program are automatically saved under the card name to a database ("card description database") as shown in FIG. 10. Each card in the card description database is defined in terms of its components, such as images, text, and personalization fields for either text or images. FIGS. 12(a) through 12(f) show how each type of component is defined within the card description database.

One preferred method of retrieving card images for display and selection by prospective card purchasers is through a series of card parameter screen displays that allow the prospective card purchaser, in response to a displayed or otherwise presented question or prompt, to describe in a progressive manner, through selection or input of a series of words, phrases or icons ("card parameters"), the type of social expression card desired. For example, the prospective card purchaser may first be asked to select or input a general class of cards, such as "Birthday", "Anniversary", "Get Well", etc. If "Birthday" is selected or input, the prospective card purchaser is then prompted to select or input a sub-classification of birthday cards, such as "Relative", "Children", or "Humorous". This process continues to prompt the prospective card purchaser to select or input card parameters until the last sub-classification of cards is reached. Upon selection of a general class of cards or an associated sub-classification, one or more card images associated with the general class of cards or an associated sub-classification are retrieved and displayed on the display device. Such card displays may take a variety of formats, for example, card images may be displayed sequentially or in sequential groups of two or more card images. These card image displays may optionally include card identification names (or codes) associated with individual card images.

Figure 11:
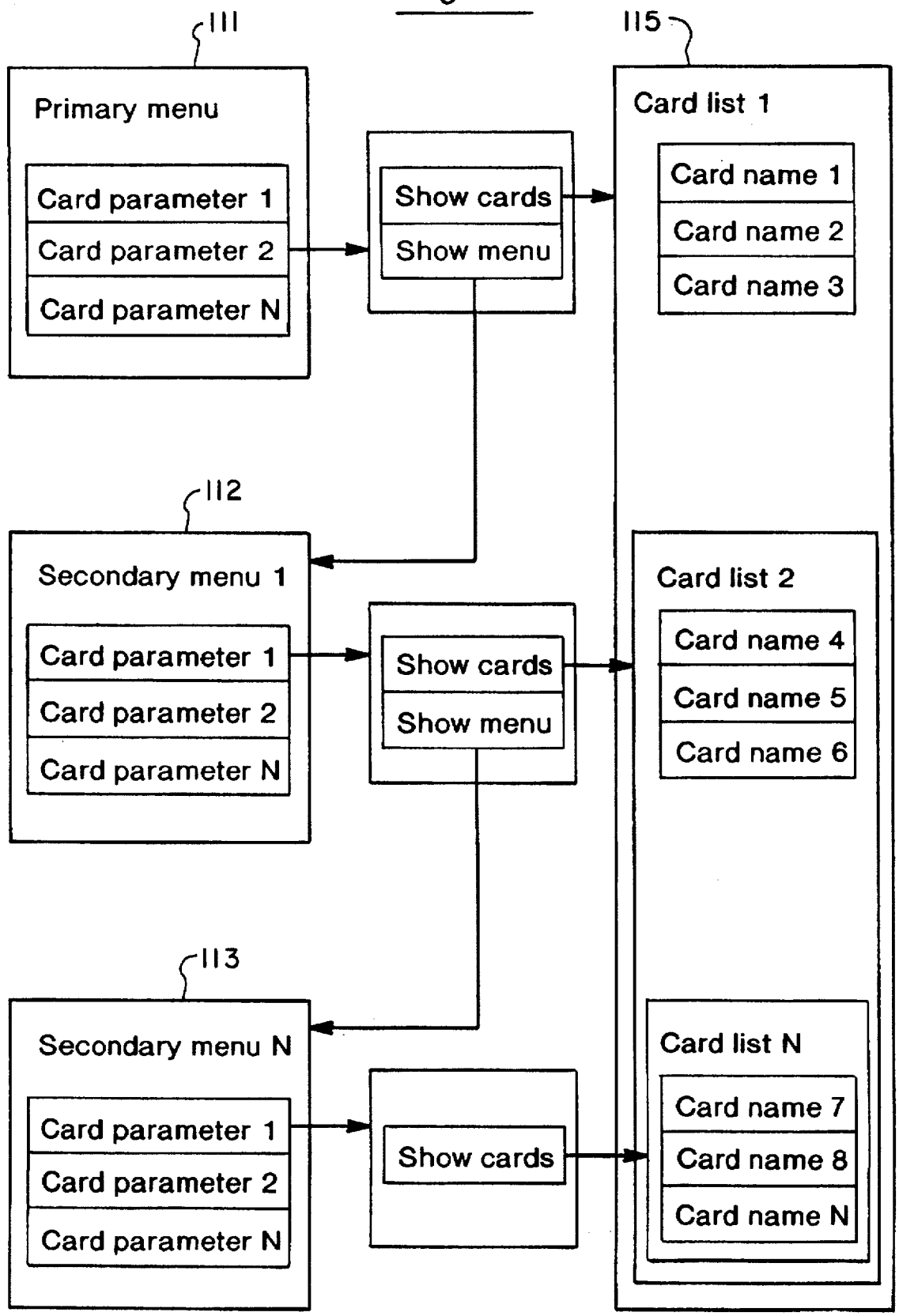
FIG. 11 is a diagram of the structure of the card parameter database.

In one embodiment, a menu is created that allows rapid retrieval of social expression card images using a software program ("menu layout program") capable of constructing a multilevel menu display ("menu screen"). One or more card parameters displayed on the menu screen may each be linked to other subordinate or secondary card parameters that are also displayed on the menu screen. These secondary card parameters can, in turn, be linked to other levels of additional parameters. Every card parameter may be linked to one or more groups of card names that can be used to retrieve card designs to be displayed to the prospective card purchaser. The structure of a typical card parameter database is shown in FIG. 11. GGEdit is such a program (SuperVend, Inc.). In the GGEdit program, a menu screen is created in a menu creation mode, in which a card parameter's text is entered and then displayed in one of several menus. The menus containing card parameter text are displayed next to each other. Card parameters may be displayed on a menu screen in a variety of formats. For example, each card parameter may be displayed in one of several adjacent menus within the menu screen.

After the first menu (primary menu) 111 has been completed, a number of secondary menus 112, 113 can be created in the menu creation mode by selecting a card parameter which appears on the primary menu 111 and inputting one or more subordinate card parameters. A secondary menu is always linked to a card parameter displayed in a higher level menu.

After one or more secondary menu linked to higher level card parameters have been created, card lists 115 are created. This may be accomplished in the GGEdit program when a menu parameter is selected. A card list window is displayed next to the primary and secondary menus. Card names of cards to be displayed in association with a selected card parameter are entered in the order in which they are to be displayed (card list window). Any time after card names are entered, the order in which they will be displayed can be changed.

Card parameters can be deleted from menu creation screens and card names from the card list by: (1) selecting the card parameter or card name; and (2) pressing the "Delete" key on the keyboard. The file created using the menu layout program (card parameter database) is automatically saved to the hard disk.

Figure 13:
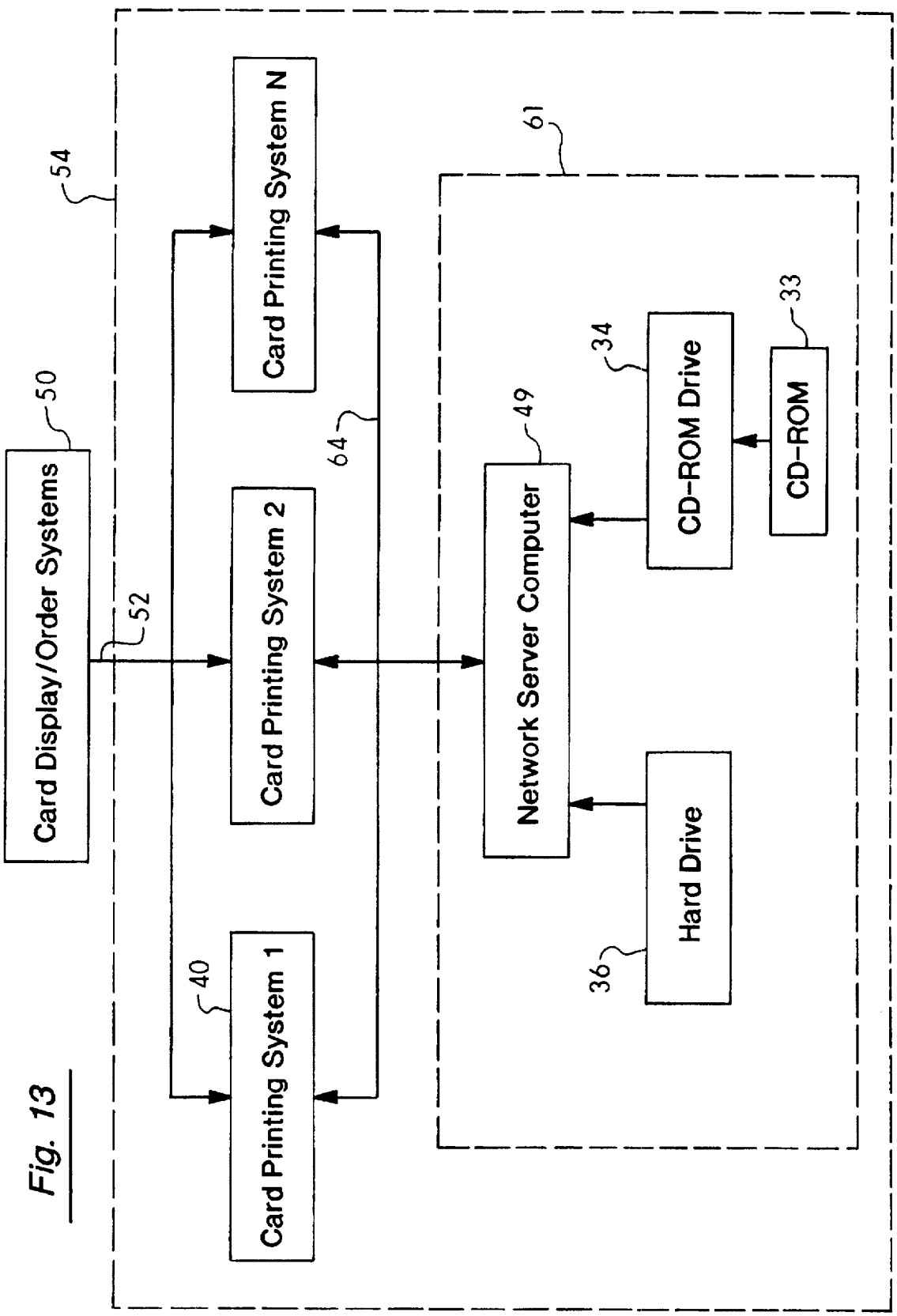
FIG. 13 is a diagrammatic view of a card printing system with networked card printing systems used for printing personalized and non-personalized social expression cards.

After these databases have been prepared by the computer system, this data (possibly excluding the card parameter database) must be transferred to either a memory storage means which may be accessed directly, for example, through a network as shown in FIG. 13, by one or more card printing systems or to a large capacity removable memory means, such as a CD-ROM, which can be distributed to an individual card printing system as shown in FIG. 3. Certain of the databases (the standard display image files, display font files, card description database, and card parameter database) may also be distributed through a network, telecommunications line, or on removable memory means, for example, a CD-ROM, directly to potential card purchasers, retail stores, cable television control centers, or other sites for use with a variety of card image display means, such as personal computers, interactive video systems, for example, a Memorex MD-2500 Video Information System (Tandy Corporation, 700 One Tandy Center, Fort Worth, Tex.), video game systems, interactive cable television systems, and other systems and devices capable of allowing users to interact with displayed information. While a variety of removable media might be used, an optical compact disc read only memory (CD-ROM) is the preferred means because (1) it will store approximately 640 megabytes of data, (2) can be produced in quantity at a low cost, (3) the data on the compact disc cannot be altered, (4) compact discs can be easily replaced and (5) CD-ROM drive devices are relatively inexpensive compared to other drive devices. Techniques for producing a CD-ROM are well known and need not be explained here. Alternatively, other types of optical or magnetic disks or similar media can be used.

In one preferred embodiment, shown in FIG. 3, each card printing system 40 comprises a computer system which, for example, includes (1) an IBM PC or compatible computer 35 (CPU) with a large quantity of RAM, for example, eight megabytes, (2) a hard disk 36, for example a Seagate Model ST1239A 211 megabyte hard drive (Seagate, 920 Disc Drive, Scotts Valley, Calif. 95066), (3) a CD-ROM drive 34 and a CD-ROM drive controller card, for example a Sony CD-ROM Drive, Model CDU-53501 (Sony Corporation of America, P.O. Box 60590, Los Angeles, Calif. 90060), (4) a graphics adapter card, for example, a VGA Integra graphics adapter (ATI Technologies, Inc.), (5) a color monitor 38, for example, a Goldstar Model 1460 Plus (Goldstar Co., Ltd.), (6) an input means 37, for example, a Maxitouch Keyboard (Maxi Switch, Tucson, Ariz.) and/or other input means such as a mouse, for example, a Logitech Pilot Mouse (Logitech Inc., 6505 Kaiser Drive, Fremont, Calif. 94555), (7) a color printer 39, for example a Tektronix Phaser III Color Printer, Model 4698RX (Tektronix, Graphics Printing and Imaging Division, 26600 S.W. Parkway, Wilsonville, Oreg. 97070), (8) a direct memory access printer interface card, for example, a DMA card (Pecan, Inc., 148 East 29$^{th}$ Street, Loveland, Colo. 80538) (9) one or more modems 41, for example, a SupraFAXModem V.32bis (Supra Corporation, 7101 Supra Drive S.W., Albany, Oreg. 97321), (10) an envelope printer 46, for example, a CoStar Address Express printer (CoStar Corporation, 22 Bridge St., Greenwich, Conn., 06830-5238) and (11) a bar code reader 42, for example, a ScanWedge bar code reader (Barcode Industries, Ammendale Technology Park, 12240 Indian Creek Court, Beltsville, Md. 20705). A floppy disk controller, IDE drive interface adapter card, and a floppy disk drive may also be included. In the preferred embodiment shown in FIG. 3, the computer system hard drive 36 in the card printing system contains (1) an operating system program, for example, DOS 5.0 (Microsoft Corporation, One Microsoft Way, Redmond, Wash. 98052), (2) a CD-ROM driver program, (3) a printer driver program, (4) a card printing system control program, for example, Cardfinder (Onkor, Ltd.), (5) a fax/communication program to transmit and receive orders, for example, FaxTalk (Thought Communications, Inc., 275 Saratoga Avenue, Santa Clara, Calif. 95050), (6) an order information database, (7) an order processing program, for example, CFXorder (Onkor, Ltd.), (8) a print list creation program, for example, CFXlist (Onkor, Ltd.) (9) one or more print list files, (10) an order information retrieval program, for example, CFXprint (Onkor, Ltd.), (11) a card/envelope registration program which registers successfully printed cards and the date on which the cards were mailed, for example, CFXship (Onkor, Ltd.), (12) a mail management program, for example, Postware Address Correction and Encoding software (Postalsoft, 4439 Mormon Coulee Road, La Crosse, Wis. 54601-8231), (13) a bar code printing program, for example, CardFinder (Onkor, Ltd.), (14) a card description database, (15) a good images file, (16) a good fonts file, (17) a good cards file, and (18) an available cards file.

FIG. 13 shows, alternatively, a number of card printing systems in a networked configuration. The card printing systems in this configuration need not have CD-ROM drives as part of each system, but each system does require a network card, for example, a Novell NE1000 Interface Board (Novell, Inc., 122 East 1700 South, Provo, Utah 84606) attached over a network interconnection means 64 and through a second network card, for example, a Novell NE2000 Interface Board (Novell, Inc.) to a network server system 61, consisting of a computer 49 which is attached to one or more large capacity memory devices 36, such as a Micropolis 668 megabyte model 1624 hard drive (Micropolis, Chatsworth, Calif.). Optionally, one or more CD-ROM drives 34 or other large capacity read only memory devices may also be attached to the server computer. Modems in each card printing system 40 receive order information for processing from card order systems 50 over telecommunications means 52, for example, telephone lines.

Other networked configurations are possible, for example, a configuration which contains one or more card printing systems each with a CD-ROM drive and a network card. The card printing systems in this configuration are in turn attached to a server computer system which includes one or more large capacity memory devices, such as a hard drive.

Figure 4:
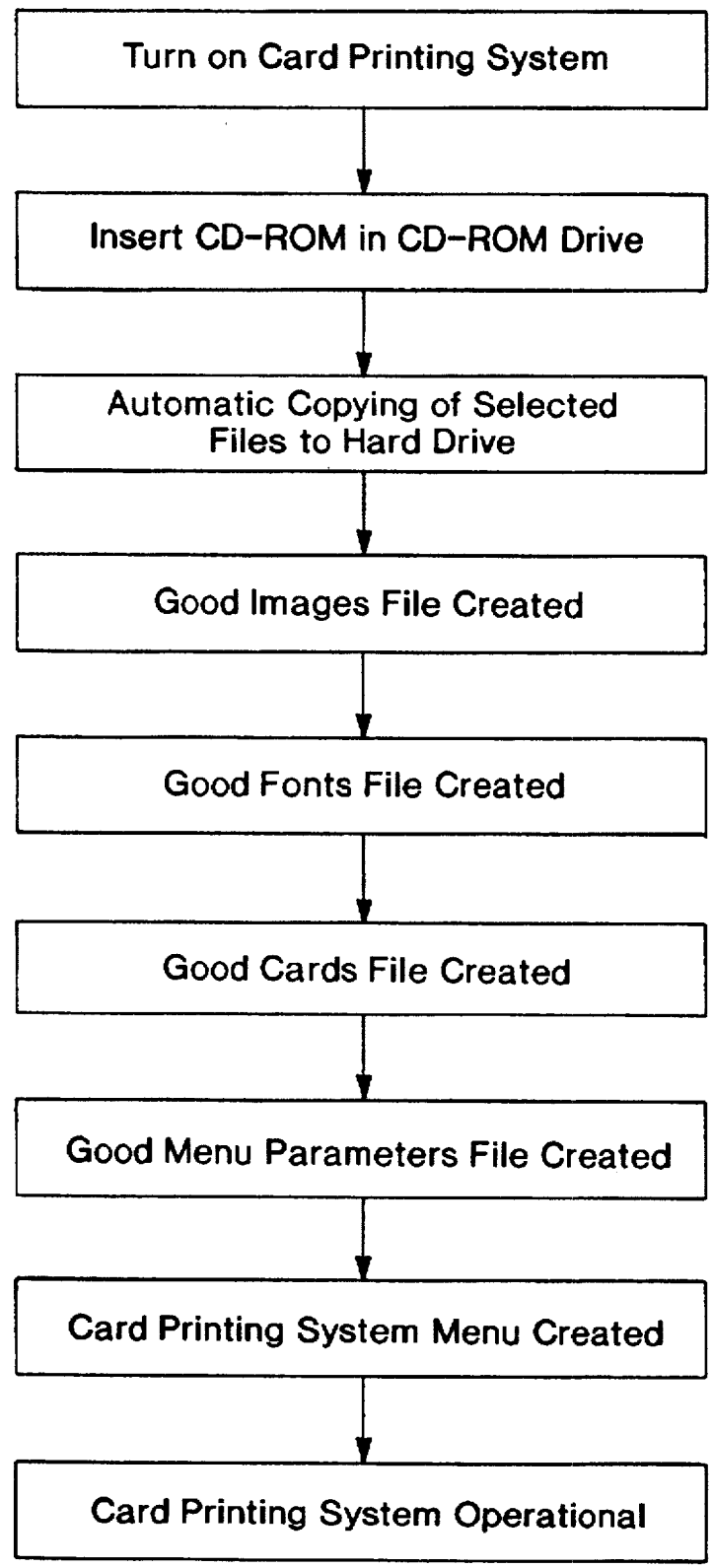
FIG. 4 is a flow chart of the method used by this invention to configure a card printing system.

As shown in FIG. 4, when a CD-ROM 33 is installed in a card printing system's CD-ROM drive 34, or a CD-ROM drive attached to a network server, the card printing system control program on the card printing system's hard disk drive 36 or a hard drive which is part of a network server system 61, analyzes the card descriptions contained in the card description database and the dithered print image files and print font files present on the CD-ROM or on a hard drive and creates three files: (1) a file indicating which dithered print images are present ("good images file"), (2) a file indicating which print font files are present ("good font files"), (3) a file indicating which card formats in the card description database have all the files present that are necessary to print cards ("good card file"). The card printing system is then operational.

Card purchasers may originate card orders at card display/order sites 66 using card display/order systems 50. In one preferred embodiment shown in FIG. 14, the card display/order system 50 requires a customer to select a card design from a card display 69, enter order information on an order form 51 and then transmit the order information over a telecommunication line 52 to a card printing system site 54, shown in FIG. 13, from a card display/order site 65 using, for example, a fax machine 53.

Figure 14:
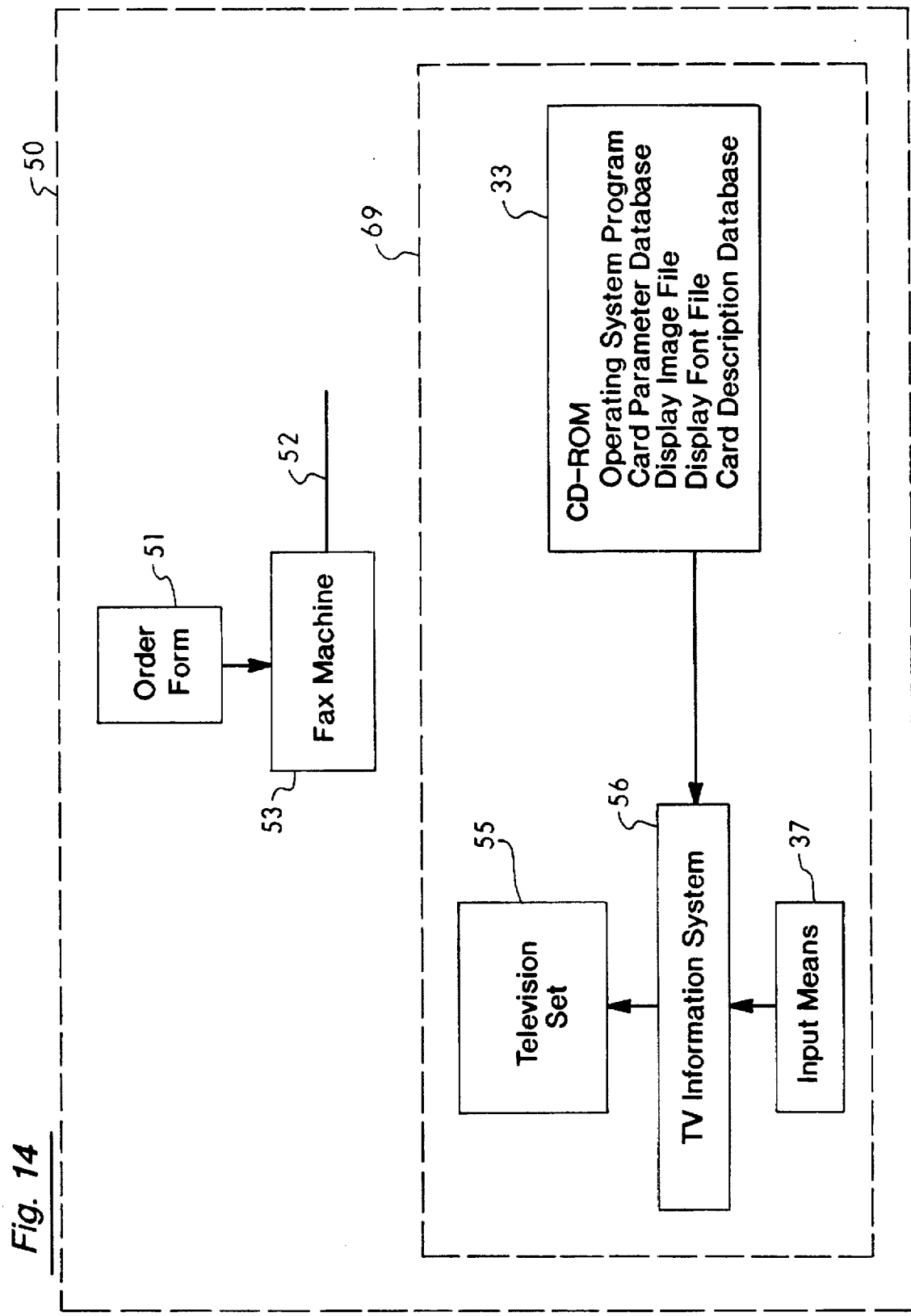
FIG. 14 is a diagrammatic view of a card display/order system where the card display means is a TV information system which is separate from the order entry and transmission means.
Figure 15:
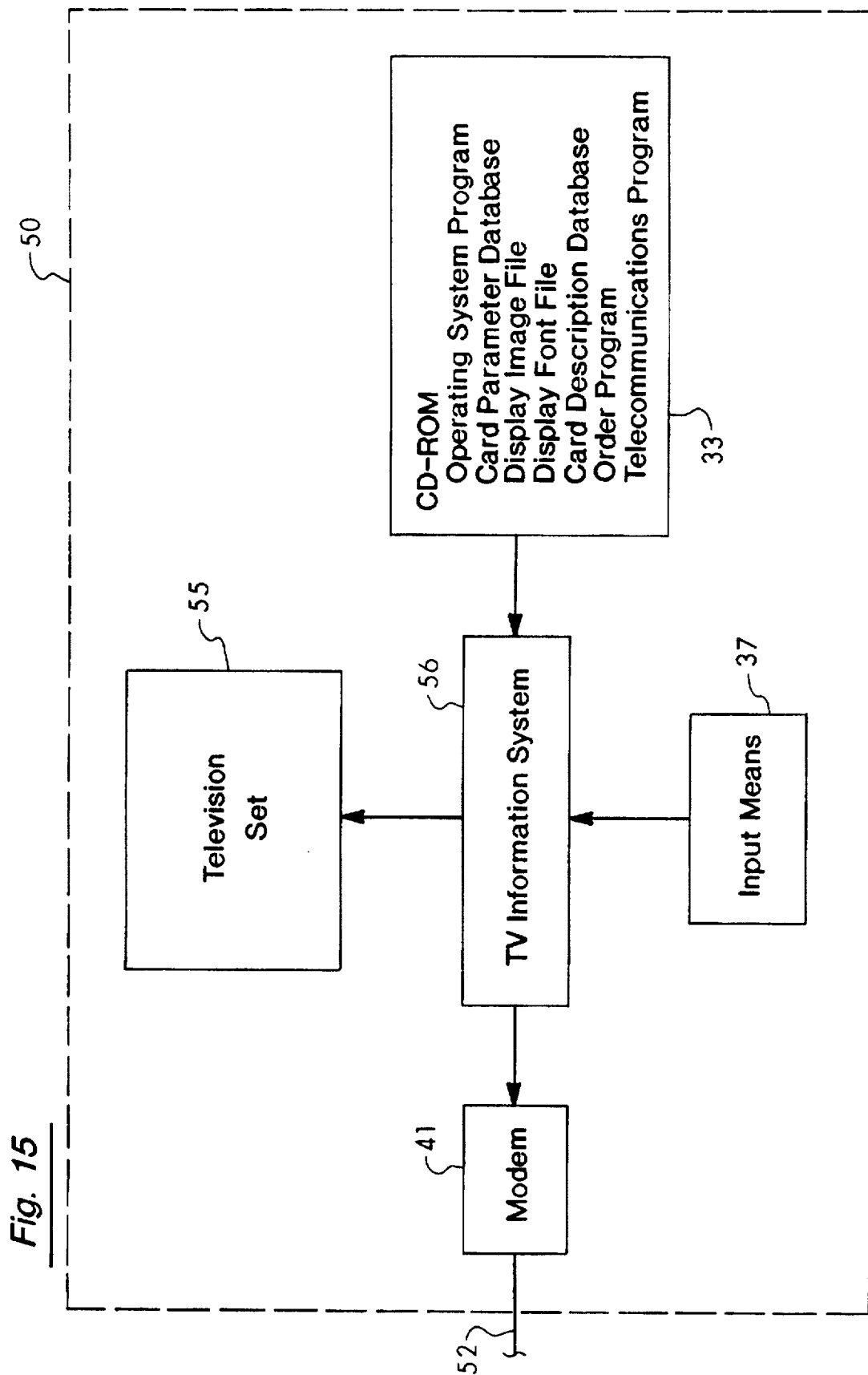
FIG. 15 is a diagrammatic view of a card display/order system where the card display means is a TV information system which is integrated with the order entry and transmission means.
Figure 16:
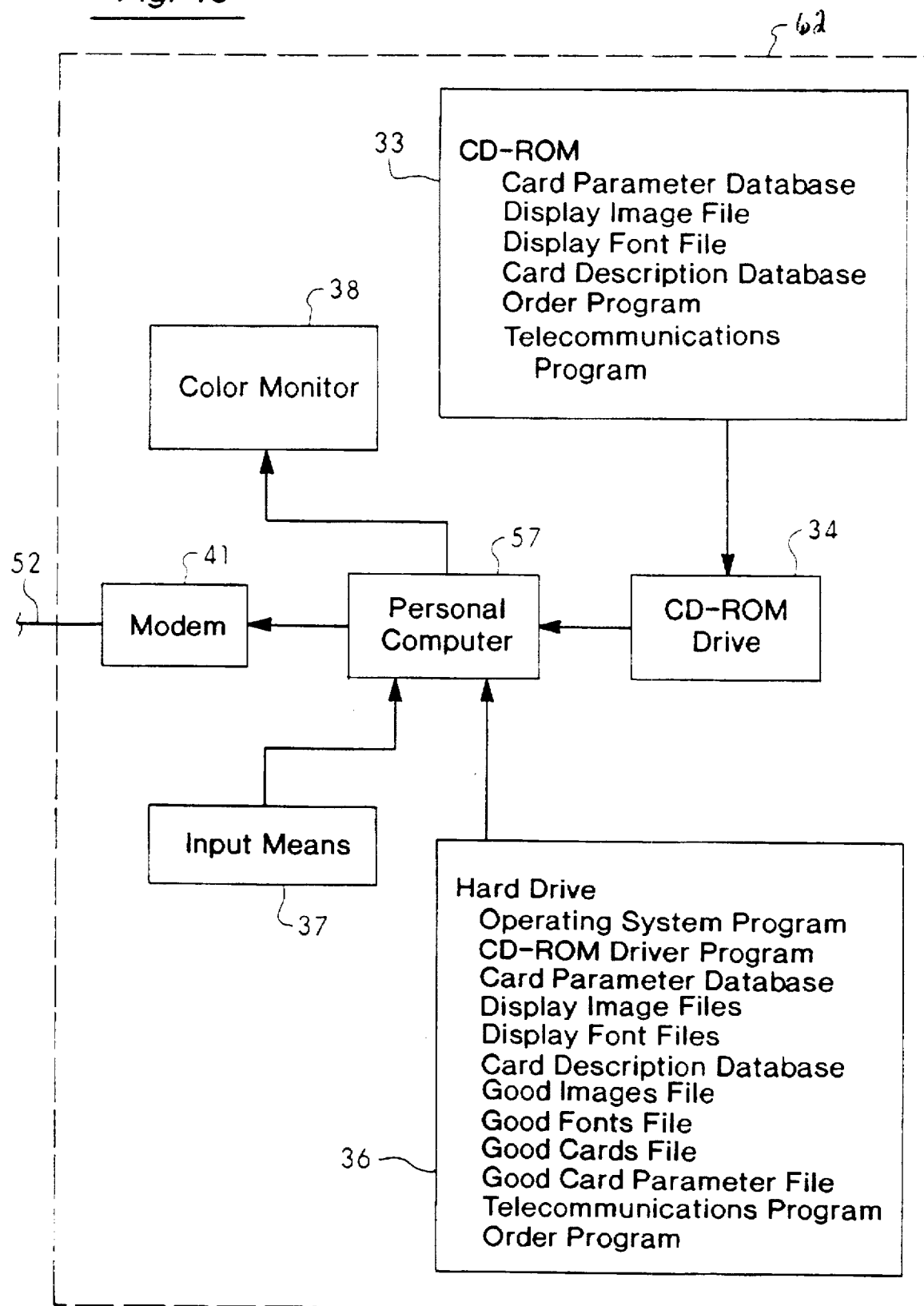
FIG. 16 is a diagrammatic view of a card display/order system where the card display means and the order entry and transmission means are accomplished using a personal computer system.

Customers may view card images using, for example, a TV information system 56 attached to a television set 55, shown in FIGS. 14 and 15, a personal computer system 62, shown in FIG. 16, or other interactive information display systems, for example a cable television card display/order system ("CATV card display/order system") 67 consisting of a television set 55 connected to a digital cable television converter which includes an integrated computer with decompression means ("smart CATV converter") 58, for example, a Jerrold DigiCable converter with interactive TV capability (General Instrument Corporation, Jerrold Communications Division, 2200 Byberry Road, Hatboro, Pa. 19040) and a modem 41 as shown in FIG. 17. In one such system, compressed card display image files are transmitted from a control computer 63 at the cable TV control center 60 over conventional cable TV line 59 to the CATV card display/order system 67, where they are decompressed by the smart CATV converter 58 and displayed on the television set 55. Card image files to be displayed are, for example, transmitted to a specific CATV card display/order system over a cable TV channel dedicated to transmitting digital information which has been encoded for reception, decompression, and display by a specific smart CATV converter with decompression means. Transmissions are made in response to commands input by the consumer, using an input means 37, for example, a wireless handheld controller. The input commands are transmitted from CATV card display/order systems 67 to the cable TV control center 60, for example, through modems 41 and telecommunication lines 52 linking the smart CATV converter 58, which is part of the CATV card display/order system 67, to the control computer 63 in the cable TV control center 60. When a displayed card is selected by the consumer for purchase, information necessary to complete an order ("order information") may be requested from the consumer by the control computer 63 or by the computer contained in the smart CATV converter 58. Such requests can take a variety of forms, for example, an order form can be displayed on a television set 55 and the consumer then enters order information using an input means 37, such as a wireless handheld controller. Order information entered by the consumer may be transmitted through a modem 41 to the control computer 63 and from the control computer 63 at the cable TV control center 60 to a card printing system site 54 over telecommunications lines 52, or order information entered by the consumer may be transmitted through the modem 41, after disconnecting from the control computer 63, directly to a card printing system site 54 over telecommunications lines 52.

Card images may be selected for display by customers using, for example, a displayed menu which allows the prospective card purchaser to describe the type of social expression card desired. Methods other than the use of a menu to select a desired type of card from available card images, may also be used.

Order information, to be transmitted to a card printing location, may be entered by customers in a variety of ways. Using one preferred method, a card identification name (or code) is entered by a customer on a printed order form 51 along with personalization information, mailing addresses, preferred card delivery date, and other order information. The order information is then transmitted by use of a fax machine 53, for example, a Brother IntelliFAX model 600 (Brother International Corporation, 200 Cottontail Lane, Somerset, N.J. 08875-6714), over telecommunication lines 52 to a card printing system site 54.

Alternatively, a card display/order system may include a modem 41 which allows a customer to place an order by using a keyboard or other input means connected to a computing means to enter order information by, for example, responding to displayed prompts which request that various items of order information be entered by the customer. The computing means may include, for example, a TV information system 56, as shown in FIG. 15 or a personal computer 57, as shown in FIG. 16. After order information is entered by a customer, the customer initiates the order transmission process by, for example, responding to a displayed prompt. Once the order transmission process is initiated, the computing means determines if a dial tone is present on the telecommunication line connected to the computing means modem. If a dial tone is present, the computing means dials a pre-programmed telephone number associated with a card printing system site and upon receiving a standard confirming transmission code from the called site the computing means transmits the order information in a standard data communication format, for example ASCII code, through the modem 41 over telecommunication lines 52 to the card printing facility 54. If the calling computing means receives a busy signal, it disconnects from the telecommunication line, waits a pre-programmed interval, for example two minutes, and then repeats the calling sequence. The computing means will continue such calling attempts until the order information has been successfully transmitted.

Figure 22:
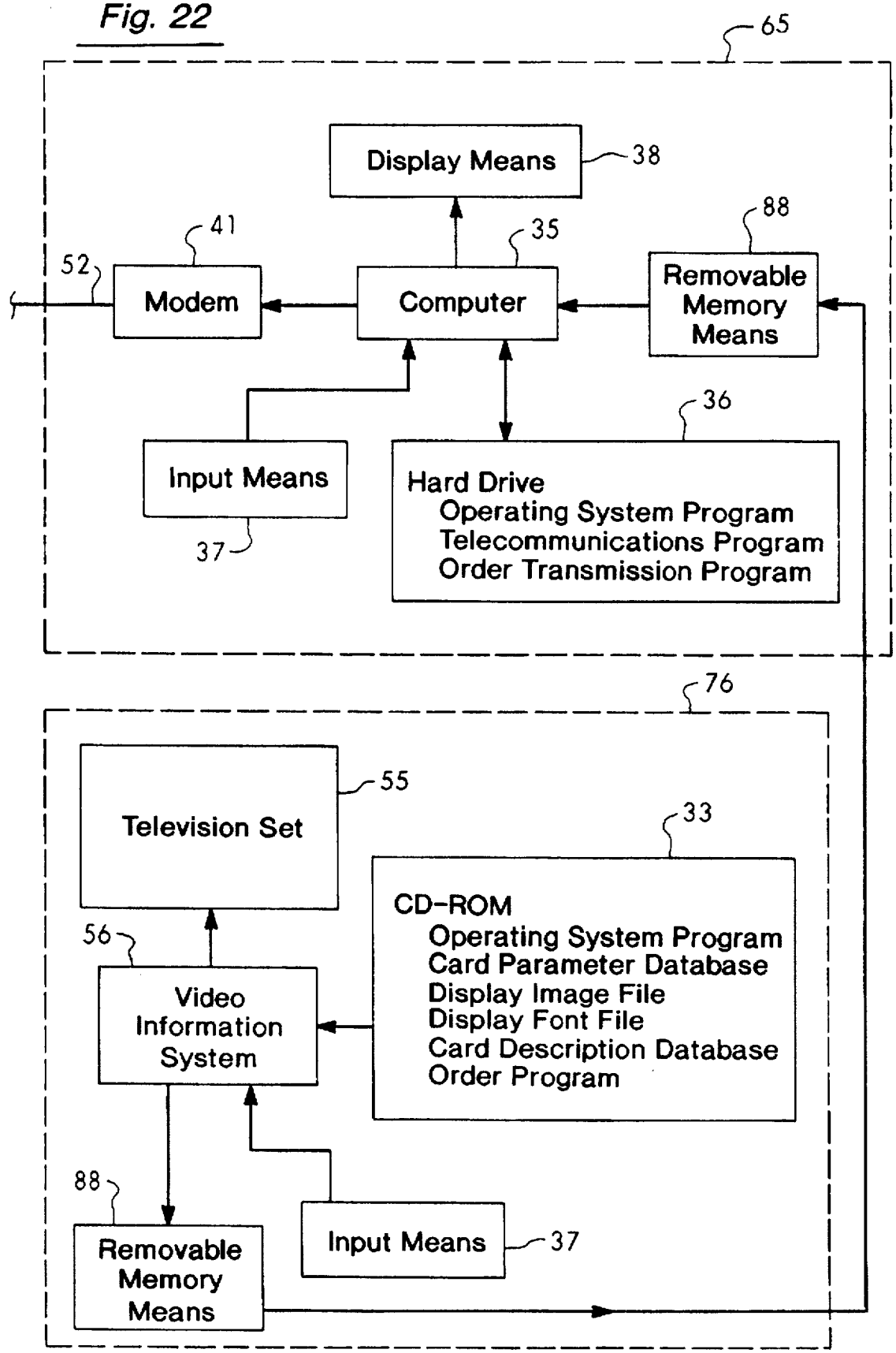
FIG. 22 is a diagram of an alternative embodiment of a card display/order system.

FIG. 22 shows one alternative embodiment in which the card display/order facility is separated into a card order transmission system 65 and a number of satellite card display systems 76. This embodiment is intended for use, for example, in a greeting card store located in an airport. The card order transmission system 65 is centrally located in the store and a number of the card display system 76 can be located within the store as well as elsewhere within the airport, such as in various concourses. Each card display system 76 includes a local CD-ROM 33 that contains copies of the card description database, card parameter database, and other files necessary to prompt a customer to input or select card parameters, view card images, and enter order information. The specific embodiment of the card display system 76 depicted in FIG. 22 uses a television set 55 and a TV information system 56 to display the card images. The customer's order information is temporarily recorded on removable memory means 88, such as a floppy diskette or a PCMCIA memory card. At the end of each day (or on some other period basis) the removable memory means 88 is manually transferred to the card order transmission system 65 where the order information can be reviewed and is then forwarded by modem 41 to a card printing facility.

Figure 19:
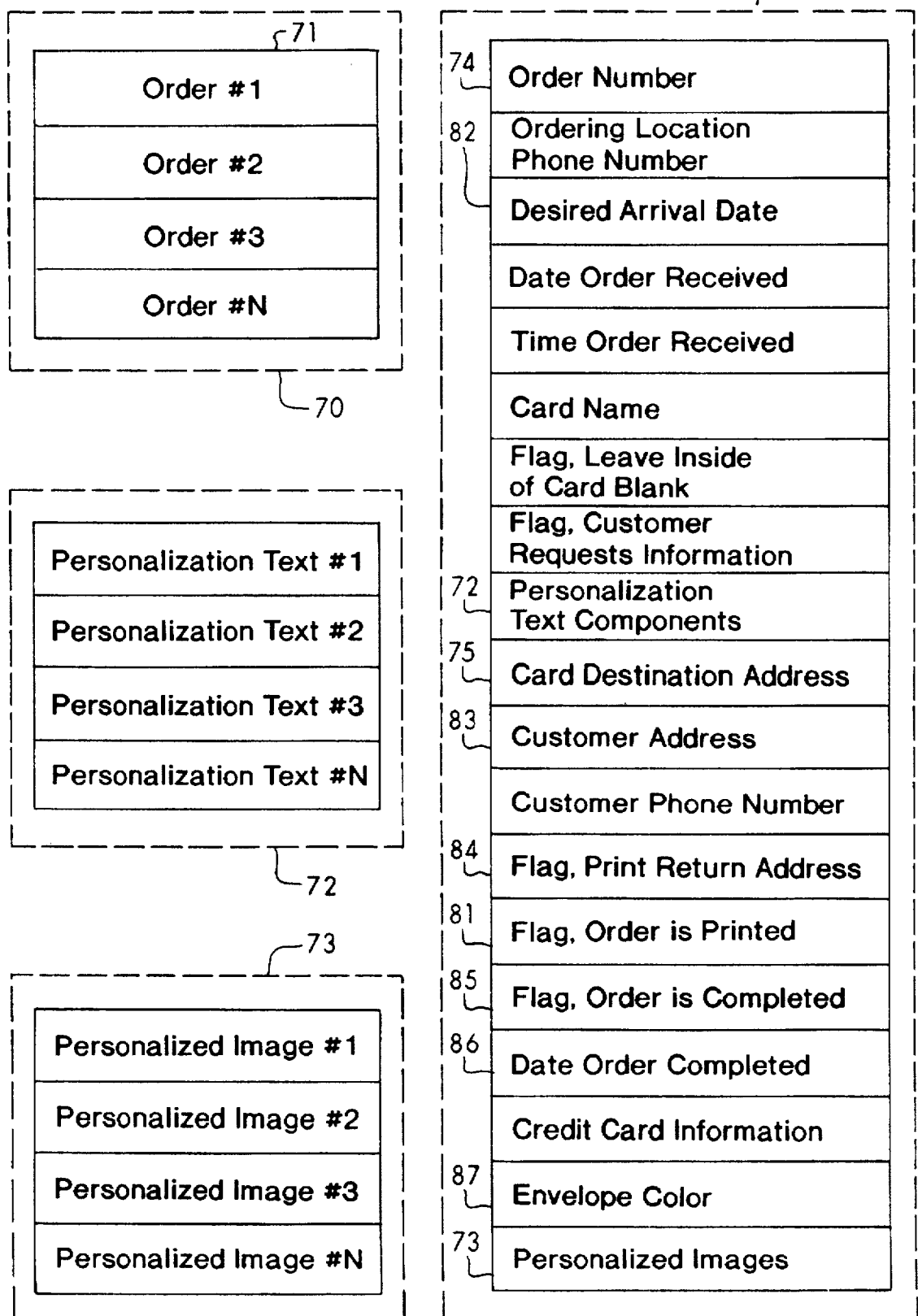
FIGS. 19, 20(a), and 20(b) are diagrams of the various components of the card order database and an individual order.
Figure 20A:
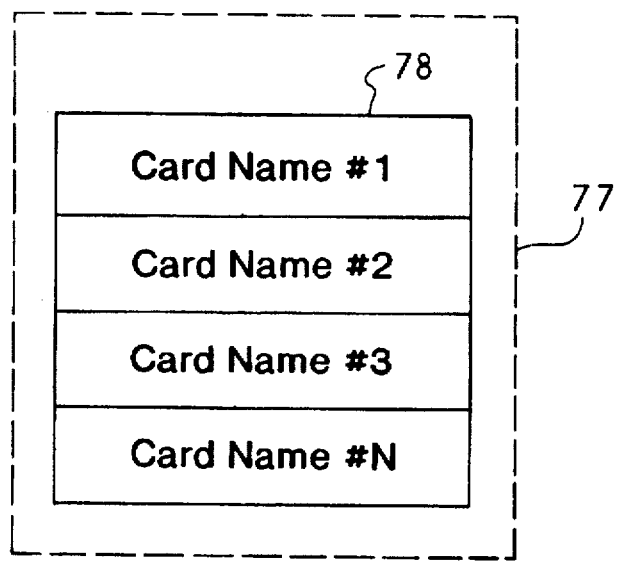
Figure 20B:
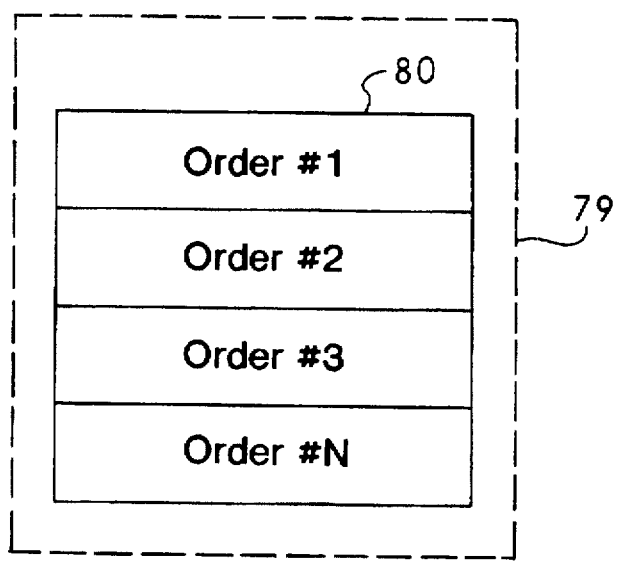

At the card printing facility, order information is received through a fax or other modem 41 connected to a card printing system computer processor 35 running a fax/communications software program, for example, FaxTalk (Thought Communications, Inc., 275 Saratoga Avenue, Suite 200C, Santa Clara, Calif. 95050). In the case of an order transmitted by means of a fax machine, the fax/communications software program receives the orders in a standard facsimile transmission format and converts them into PCX image format files. The PCX image of the order form ("PCX order image") is stored in an order image file and is used by an order processing program such as CFXorder (Onkor, Ltd., P.O. Box 240, Masonville, Colo. 80541) or TELEform for Windows (Cardiff Software, Inc., 531 Stevens Avenue, Solana Beach, Calif. 92075), to (1) analyze the order information contained in the PCX order image, such as card identification information, personalized text, mailing addresses, and personalized images, and (2) store the order information in the order information database. The CFXorder program displays a split screen with a fax image on one side of the screen and order information fields on the other side. The CFXorder program (1) automatically compares card identification information ("card name") entered in the card name order information field with a database of card names ("printable card file" 77), representing cards available for printing, to confirm that an available card name 78 has been ordered. CFXorder also checks and corrects address information entered in order information fields by reference to a mail management program, for example, Postware Address Correction and Encoding software (Postalsoft, 4439 Mormon Coulee Road, La Crosse, Wis. 54601-8231). The processed order information for each order 71 is then automatically stored in the order information database 70 in the format shown in FIGS. 19, 20(a), and 20(b).

Alternatively, a program, such as TELEform for Windows (Cardiff Software, Inc.), which includes a hand print and machine print character recognition program, may be used to analyze the PCX order image. The resulting order information is automatically stored in the order information database 70.

Figure 21:
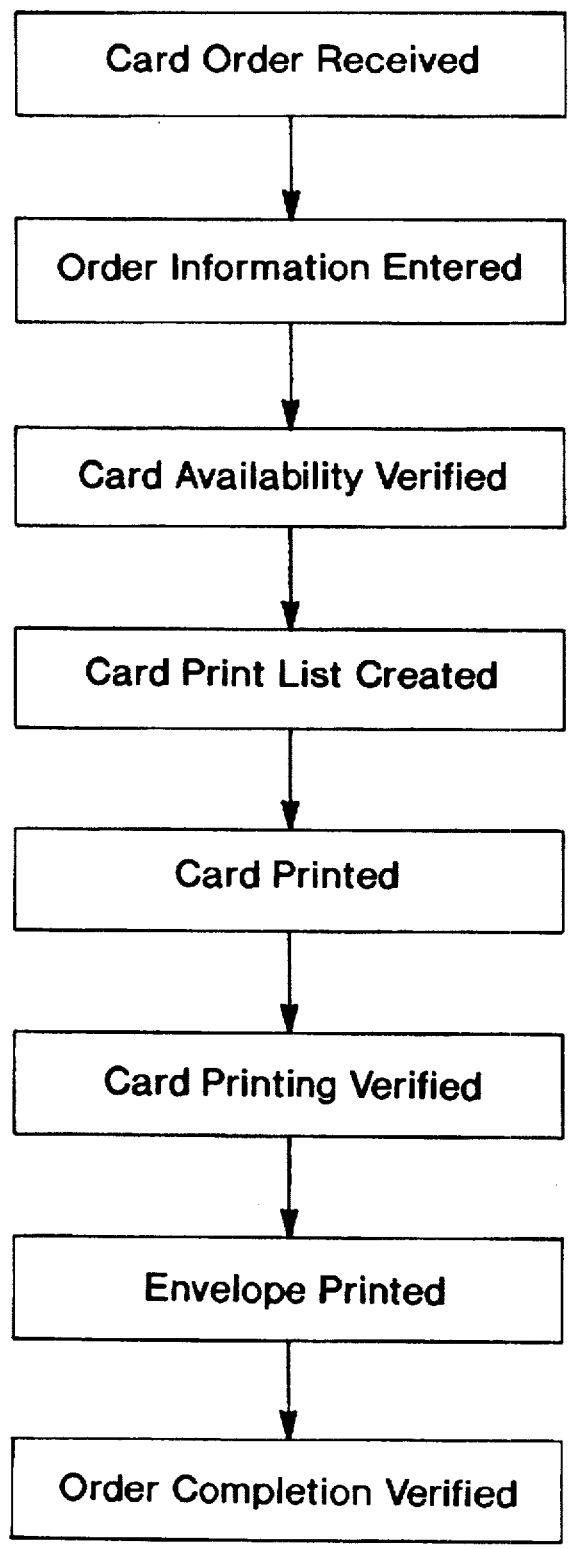
FIG. 21 is a diagram of how a card order is processed.

When order information is transmitted in the form of ASCII or other data communication formats from, for example, a card display/order system 50 to the card printing system site 54, the information received is processed by an order processing program, such as CFXorder (Onkor, Ltd.). Each processed order is stored by the order processing program in the order information database 70 for subsequent processing as generally outlined in FIG. 21.

Methods of processing orders may vary depending on the order processing program used, for example, the program CFXorder, processes orders received as PCX files from fax machines by displaying a bit-mapped image of the fax on a monitor along with blank data entry fields. The user visually examines the fax image and enters the displayed order information in appropriate data entry fields. After all order information is entered, the user selects the "save" function which causes the program to save the order information entered in the data entry fields to the order information database. In addition, a properly sized and formatted personalized image ("signature image") is also saved from the original fax and is logically connected to the correct card order number 74 in the order information database 70. The saved signature image may be saved in any number of standard image file formats, such as PCX or TIFF, as well as proprietary image file formats, such as PCD used by the program CFXorder (Onkor, Ltd.) Optionally, if the card destination address 75 zip code stored in the order information database 70 matches a zip code stored on a hard drive 36 in a file which lists zip codes in association with remote card printing system sites ("printing site zip code list"), the order information may be automatically transmitted by the card printing system computer 35 at the site which received the original card order, using a modem 41 attached to telecommunications means 52, to a card printing system site listed on the printing site zip code list.

Order information indicating when an ordered card is to be delivered 82 is retrieved from the order information database 70 and lists of cards (or orders) to be printed on specific dates ("print list files") 79 are automatically created by a program such as CFXlist (Onkor, Ltd.). The CFXlist program determines a printing date based on a card delivery date specified by a customer in an order. If no date is specified, the current date is used. The card order code (or number) of any card order that has not been printed and has a customer specified delivery date which is on or before the current date is automatically listed by CFXlist in a daily print file named CFXLIST.OUT ("print list file"). At a specified time each day, active card printing systems run a program, such as CFXprint (Onkor, Ltd.), which retrieves order information 71 from the order information database 70 for those card orders 80 listed in the current date print list file 79. CFXprint then calls a program such as CardFinder (Onkor, Ltd.) which prints each ordered card on blank card paper 47, as shown in FIG. 3, including a bar code 44 on the back card panel (or page). The bar code, which is generated by a bar code program such as Quick Bar (American Microsystems, 23190 Regal Parkway, Euless, Tex. 76040), represents the unique card order number (or code) for the card printed.

When a card is successfully printed this is recorded in the card's order information in the order information database ("registered"). Registration can be accomplished several ways. One method is to run a program such as CFXship (Onkor, Ltd.) on a computer 35 with a bar code reader 42, for example, a ScanWedge bar code reader (Barcode Industries, Ammendale Technology Park, 12240 Indian Creek Court, Beltsville, Md. 20705) attached to the computer's input means 37, for example a keyboard. The bar code reader 42 may be used to read the bar code 44 on the back panel (or page) of a printed card 43, the card's order information 81 in the order information database 70 is updated to indicate the ordered card corresponding to the card order code has been successfully printed. Successful registration automatically causes CFXship to query the portion of the card's order information 71 in the order information database 70 for envelope color 87 and envelope addressing information 75, 83, 84. Address information retrieved is printed on a blank envelope 45 of the specified color 87, along with a code 44, for example a bar code, representing the card order code, using a printer 46, for example, a CoStar Address Express printer (CoStar Corporation, 22 Bridge St., Greenwich, Conn., 06830-5238). A printed card 43 may then be matched with the correct printed envelope 48 by using, for example, either a single bar code reader 42 to sequentially read the bar code on the rear card panel and the bar code on the envelope or by using two bar code readers to simultaneously read both bar codes. If the bar codes on the printed card and printed envelope are identical, a signal, for example a distinctive audible tone, is output by the computer 35 indicating that the card should be inserted in the envelope and the card's order information 71 in the order information database 70 is updated to indicate the card order has been successfully processed 85 and the date the processing was completed 86.

Figure 23:
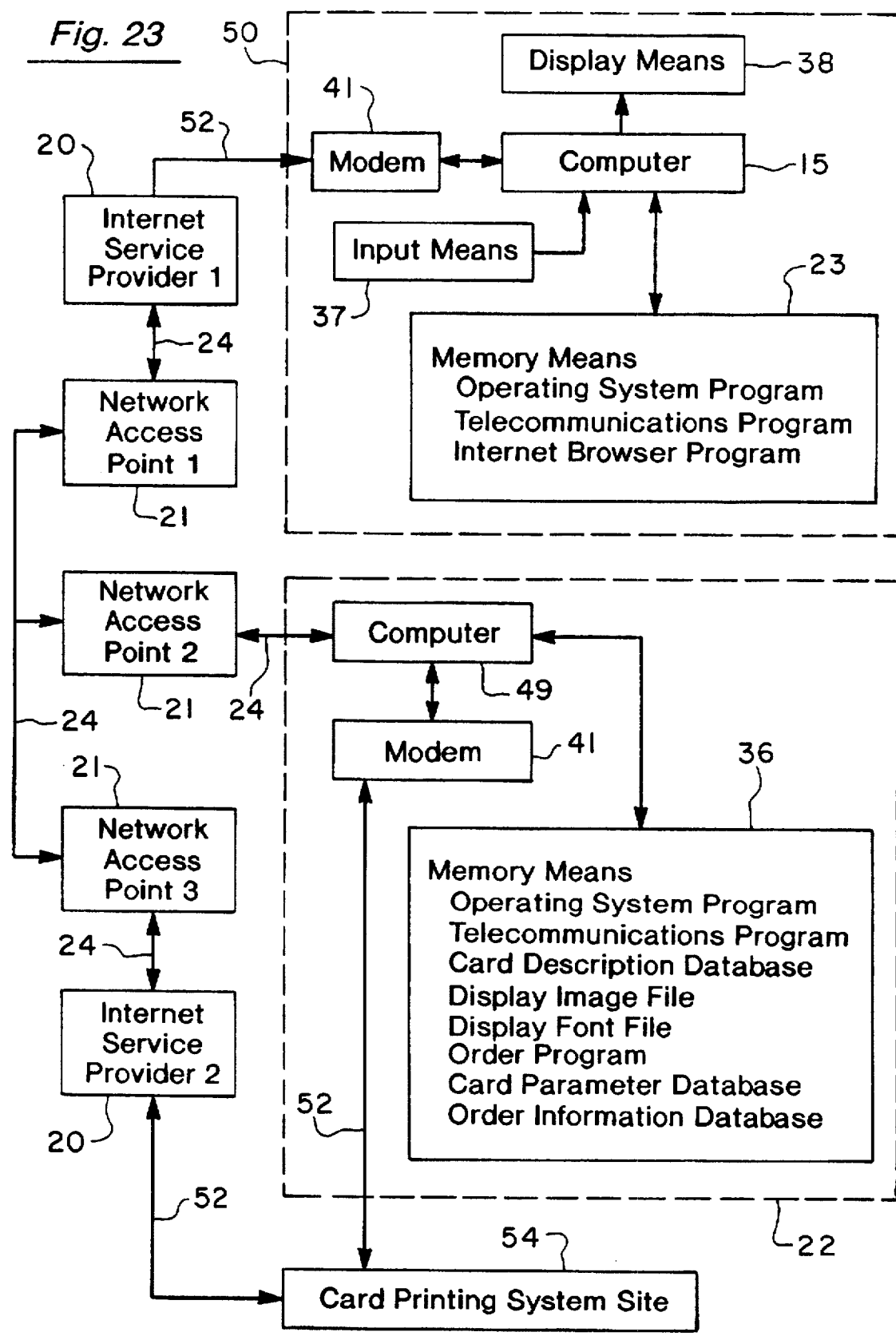
FIG. 23 is a diagram of another alternative embodiment in which the card printing system and card display/order systems communicate via the Internet.

FIG. 23 is a schematic block diagram of an alternative embodiment of the present invention in which the card description database, display image files, display font files, card parameter database, and order program are stored at a server 22 that may be separate from the card display/order system 50 and the card printing system 54. For example, the server 22 can be a node on a local area network (LAN), wide area network (WAN), cable television (CATV) network, or the Internet that is accessible by card display/order system 50 and card printing system 54.

The specific implementation shown in FIG. 23 is based on access via the Internet. The card display/order system 50 has the same general configuration as previously discussed. However, the memory 23 for the card display/order system 50 does not include a card description database, display image file, display font file, card parameter database, or order program. Instead, an Internet browser program, such as Netscape Navigator (Netscape Communications Corp., Mountain View, Calif.) or Internet Explorer (Microsoft Corp., Redmond, Wash.) is installed to access such software over the Internet. Because of the small size of the programs required at the card display/order system 50, the memory 23 need not be a hard disk, but may be any of the many forms of solid state random access memory that are currently available.

Using the Internet browser software, the card display/order system 50 accesses the Internet server 22 through an Internet service provider 20. At the Internet server 22, there is a large capacity memory device 36 that contains all the software necessary to display cards and accept orders, in addition to programs normally found on such sites. Included in this software are, for example, a card description database, display image file, display font file, card parameter database, order program, and order information database. These programs enable the user of the card display/order system 50 to select, view, and order social expression cards using the Internet browser software.

Orders transmitted to an Internet server 22 may be automatically transferred to a card printing system site 54 or stored for later retrieval from the Internet server 22 by the card printing system 54. A number of possible telecommunications links can be used between the card printing system site 54 and the Internet server 22. For example, a broadband telecommunications link 24, such as a T1, T3, or ISDN line can be used to connect the Internet server 22 to a network access point 21. Alternatively, a direct telecommunications line 52 (e.g., a standard telephone line) can be used to connect the card printing system 54 to an Internet server 22.

Another possible embodiment is based on a cable television (CATV) network. A server at the headend of the CATV network stores the card description database, image files, font files, card parameter database, and order program. Each subscriber unit includes a cable modem or a cable television converter that allows upstream communications from the subscriber unit to the headend. The subscriber unit acts as the card display/order system discussed in the previous embodiments, and has the same general configuration as previously discussed. Here again, the memory for the card display/order system 50 does not include a card description database, display image file, display font file, card parameter database, or order program. Instead, a communications program is installed to access the server over the CATV network.

The server includes a large capacity memory device 36 that contains all the software necessary to display cards and accept orders, such as the card description database, display image file, display font file, card parameter database, order program, and order information database. These programs enable the user of the card display/order system to select and view social expression cards via downstream communications from the server over the CATV network. Orders are transmitted upstream from the card display/order system to the headend server. Order information may be automatically transferred to a card printing system site or stored by the server for later retrieval by the card printing system.

The above disclosure sets forth a number of embodiments of the present invention. Other arrangements or embodiments, not precisely set forth, could be practiced under the teachings of the present invention and as set forth in the following claims.

We claim:

1. A system for printing social expression cards comprising:

a server having:
        (a) means for electronically receiving order information for a selected card; and
        (b) data storage means for storing a database describing each social expression card;
    a card printing facility having:
        (a) means for electronically retrieving said order information from said server;
        (b) a printer; and
        (c) processor means for selectively retrieving card description data for said selected card specified in said order information, and printing said database information for said selected card using said printer; and at least one card display/order facility separate and remote from said card printing facility and said server having:
(a) means for accessing said card description database at said server;
(b) means for inputting card parameters;
(c) means for retrieving and visually displaying cards associated with said card parameters from said card description database at said server;
(d) means for inputting order information; and
(e) means for electronically transmitting said order information to said server.

2. The system of claim 1 wherein said data storage means of said server further comprises a card parameter database for prompting a customer to select a series of card parameters for displaying cards associated with said card parameters in said card description database.

3. The system of claim 1 wherein said card server and said card display/order facility comprise computers communicating over a network, and said card description database is accessed by said card display/order facility over said network, and said orders are transmitted over said network from said card display/order facility to said server.

4. The system of claim 1 wherein said display means at said card display/order facility comprise a television set, and said access means comprise a cable television converter communicating with said server over a cable television system.

5. The system of claim 1 wherein said order information comprises the name and address of the intended recipient of the card.

6. The system of claim 1 wherein said order information comprises a card identifier.

7. The system of claim 1 wherein said order information comprises a card delivery date.

8. The system of claim 1 wherein said order information comprises the name and address of the card purchaser.

9. The system of claim 1 wherein said order information comprises information for personalization of the card, and wherein said card printing facility further comprises means to incorporate said personalization information into the card printed by said printer.

10. The system of claim 9 wherein said personalization information comprises text.

11. The system of claim 9 wherein said personalization information comprises handwriting.

12. The system of claim 9 wherein said personalization information comprises images.

13. The system of claim 1 wherein said orders are transmitted by means of a modem over telephone lines.

14. The system of claim 1 wherein said card description database comprises text to be printed for each card.

15. The system of claim 1 wherein said card description database comprises images to be printed for each card.

16. A system for vending and printing social expression cards comprising:
a database preparation system having:
(a) means for inputting text for each of said cards;
(b) means for creating a high-resolution print font for each text;
(c) means for creating a lower-resolution display font for each text; and
(d) means for creating a card description database defining the layout of each card in terms of its text and other components and their locations on the card;

at least one card printing facility having:
(a) means for electronically receiving orders for a selected card;
(b) a printer; and
(c) means for retrieving said high-resolution print fonts for said selected card using said card description database, and printing said text using said printer; and at least one card display/order facility separate and remote from said card printing facility having:
(a) means for accessing said card description database;
(b) means for inputting card parameters;
(c) means for retrieving and visually displaying said display fonts for cards associated with said card parameters;
(d) means for selecting one of said displayed cards;
(e) means for inputting order information; and
(f) means for electronically transmitting an order for a selected card to said card printing facility.

17. The system of claim 16 wherein said card description database further comprises information for each card concerning the location, size, font and color of text on the card.

18. The system of claim 16 wherein said card description database further comprises information on fields that can be personalized for each card.

19. The system of claim 16 wherein said order information comprises the name and address of the intended recipient of the card.

20. The system of claim 16 wherein said order information comprises a card identifier.

21. The system of claim 16 wherein said order information comprises a card delivery date.

22. The system of claim 16 wherein said order information comprises the name and address of the card purchaser.

23. The system of claim 16 wherein said order information comprises information for personalization of the card, and wherein said card printing facility further comprises means to incorporate said personalization information into the card printed by said printer.

24. The system of claim 23 wherein said personalization information comprises text.

25. The system of claim 23 wherein said personalization information comprises handwriting.

26. The system of claim 23 wherein said personalization information comprises images.

27. The system of claim 16 wherein said orders are transmitted by means of a modem over telephone lines.

28. The system of claim 16 wherein said card printing facility and said card display/order facility comprise computers communicating over a network, and said card description database and card parameter database are accessed by said card display/order facility over said network, and said orders are transmitted over said network from said card display/order facility to said card printing facility.

29. The system of claim 16, wherein said card display/order facility display means comprise a television set, and said access means comprise a cable television converter communicating with said card printing facility over a cable television system.

30. A system for printing social expression cards comprising:
a server having:
(a) means for electronically receiving order information for a selected card; and
(b) data storage means for storing a database describing each social expression card;

a card printing facility having:
- (a) means for electronically retrieving said order information from said server;
- (b) a printer; and
- (c) processor means for selectively retrieving card description data for said selected card specified by said order information, and printing said database information for said selected card using said printer; and at least one card display/order facility separate and remote from said card printing facility and said server having:
- (a) means for electronically retrieving and visually displaying cards described in said card description database of said server;
- (c) means for inputting order information; and
- (d) means for electronically transmitting said order information to said server.

31. The system of claim 30 wherein said data storage means of said server further comprises a card parameter database for prompting a customer at said card display/order facility to input a series of card parameters for displaying cards associated with said card parameters in said card description database.

32. The system of claim 30 wherein said order information comprises the name and address of the intended recipient of the card.

33. The system of claim 30 wherein said order information comprises a card identifier.

34. The system of claim 30 wherein said order information comprises a card delivery date.

35. The system of claim 30 wherein said order information comprises the name and address of the card purchaser.

36. The system of claim 30 wherein said order information comprises information for personalization of the card, and wherein said card printing facility further comprises means to incorporate said personalization information into the card printed by said printer.

37. The system of claim 36 wherein said personalization information comprises text.

38. The system of claim 36 wherein said personalization information comprises handwriting.

39. The system of claim 36 wherein said personalization information comprises images.

* * * * *